(12) United States Patent
Chiou et al.

(10) Patent No.: US 6,370,622 B1
(45) Date of Patent: Apr. 9, 2002

(54) METHOD AND APPARATUS FOR CURIOUS AND COLUMN CACHING

(75) Inventors: Derek Chiou, Cambridge, MA (US); Boon S. Ang, Sunnyvale, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/444,326

(22) Filed: Nov. 19, 1999

Related U.S. Application Data

(60) Provisional application No. 60/109,207, filed on Nov. 20, 1998, and provisional application No. 60/150,146, filed on Aug. 20, 1999.

(51) Int. Cl.$^7$ .............................................. G06F 13/14
(52) U.S. Cl. ........................ 711/146; 711/119; 711/129; 711/128; 711/133; 711/153; 711/173; 711/202
(58) Field of Search ................................. 711/146, 119, 711/130, 128, 129, 133, 153, 173, 202

(56) References Cited

U.S. PATENT DOCUMENTS

| | | | |
|---|---|---|---|
| 4,430,712 A | 2/1984 | Coulson et al. | 364/300 |
| 4,833,642 A | 5/1989 | Ooi | 365/49 |
| 4,905,141 A | 2/1990 | Brenza | 364/200 |
| 4,928,239 A | 5/1990 | Baum et al. | 364/200 |

(List continued on next page.)

FOREIGN PATENT DOCUMENTS

JP 8263377 10/1996

OTHER PUBLICATIONS

González, A. et al., "A Data Cache with Multiple Caching Strategies Tuned to Different Types of Locality," Proceedings of 9$^{th}$ ACM International Conference on Super Computing, Jul. 3–7, 1995, Barcelona, Spain, 338–347.

Chiou, D., "RISCy Memory: Column and Curious Caches", Proceedings of the 1998 MIT Student Workshop on High–Performance Computing in Science and Engineering; MIT/LCS/TR–737 Jan., 1998.

Milutinovic, V., et al., "The Cache Injection/Cofetch Architecture: Intitial Performance Evaluation", Proceedings of the IEEE Mascots–97, Haifa, Israel, Jan. 12–15, 1997.

Stone, Harold S., et al., "Optimal Partitioning of Cache Memory", IEEE Transactions on Computers, vol. 41, No. 9, pp. 1054–1068, Sep. 1992.

Thibeault, et al., "Improving Disk Cache Hit–Ratios Through Cache Partitioning", IEEE Transactions on Computers, vol. 41, No. 6, pp. 665–676, Jun. 1992.

(List continued on next page.)

Primary Examiner—Do Hyun Yoo
Assistant Examiner—Jasmine Song
(74) Attorney, Agent, or Firm—Hamilton Brook Smith & Reynolds, P.C.

(57) ABSTRACT

Curious caching improves upon cache snooping by allowing a snooping cache to insert data from snooped bus operations that is not currently in the cache and independent of any prior accesses to the associated memory location. In addition, curious caching allows software to specify which data producing bus operations, e.g., reads and writes, result in data being inserted into the cache. This is implemented by specifying "memory regions of curiosity" and insertion and replacement policy actions for those regions. In column caching, the replacement of data can be restricted to particular regions of the cache. By also making the replacement address-dependent, column caching allows different regions of memory to be mapped to different regions of the cache. In a set-associative cache, a replacement policy specifies the particular column(s) of the set-associative cache in which a page of data can be stored. The column specification is made in page table entries in a TLB that translates between virtual and physical addresses. The TLB includes a bit vector, one bit per column, which indicates the columns of the cache that are available for replacement.

46 Claims, 12 Drawing Sheets

U.S. PATENT DOCUMENTS

| | | | |
|---|---|---|---|
| 5,228,136 A | 7/1993 | Shimizu et al. | 395/425 |
| 5,353,425 A | 10/1994 | Malamy et al. | 395/425 |
| 5,386,538 A | 1/1995 | Nye | 395/425 |
| 5,394,531 A | 2/1995 | Smith | 395/425 |
| 5,584,014 A | 12/1996 | Nayfeh et al. | 395/461 |
| 5,717,893 A | 2/1998 | Mattson | 395/456 |

OTHER PUBLICATIONS

Busquets–Mataix, José V. et al., "Hybrid Instruction Cache Partitioning for Preemptive Real–Time Systems", IEEE Proceedings of $9^{th}$ Euromicro Workshop on Real–Time Systems, pp. 56–63, Jun., 1997.

Busquets–Mataix, José V. et al., "Adding Instruction Cache Effect to Schedulability Analysis of Preemptive Real–Time Systems", IEEE Proceedings of IEEE Real–Time Technology and Application Symposium, pp. 204–212, 1996.

Liedtke, Jochen, et al., "OS–Controlled Cache Predictability for Real–Time Systems", IEEE Proceedings of $3^{rd}$ IEEE Real–Time Technology and Applications Symposium, pp. 213–223, 1997.

Kirk, David B., "Process Dependent Static Cache Partitioning for Real–Time Systems", IEEE Proceedings of $9^{th}$ Real–Time Systems Symposium, pp. 181–190, 1988.

Kirk, David B., et al., "Allocating SMART Cache Segments for Schedulability", IEEE Proceedings of Euromicro '91 Workshop Real–Time Systems, pp. 41–50, 1991.

Kamel, Nabil N., "Predicate Caching for Data–Intensive Autonomous Systems", IEEE Computer, pp. 77–83, Nov., 1997.

Philips, "Programmable Media Processor TriMedia TM–1100," Jun., 1999.

Sherwood, T., et al., "Reducing Cache Misses Using Hardware and Software Page Placement," *Proceedings of the International Conference on Supercomputing*, 1–10 (Jun., 1999).

González, A., et al., "The Dual Data Cache: Improving Vector Caching in Scalar Processors," Univ. Politènica de Catalunya., UPC DAC 1194–17, (1994).

Bershad, B.N., et al., "Avoiding Conflict Misses Dynamically in Large Direct–Mapped Caches," ASPLOS VI, 1994.

Romer, T.H., et al., "Dynamic Page Mapping Policies for Cache Conflict Resolution on Standard Hardware," Proceedings of USENIX Symposium on Operating Systems Design and Implementation, pp. 255–266 (1994).

Tyson, G., et al., "A Modified Approach to Data Cache Management," Proceedings of the $28^{th}$ Annual International Symposium on Microarchitecture Ann Arbor, MI, Nov./Dec., 1995.

Shen, X., et al., "CACHET: An Adaptive Cache Coherence Protocol for Distributed Shared–Memory Systems," Computation Structures Group Memo 414, Massachusetts Institute of Technology, pp. 1–12, Oct. 1998 (Rev. Mar. 1999).

Shen, X., et al., "Commit–Reconcile & Fences (CRF): A New Memory Model for Architects and Compiler Writers," Computation Structures Group Memo 413, Massachusetts Institute of Technology, pp. 1–12, Oct. 1998 (Rev. Feb. 1999).

Westerholz, K., et al., "Improving Performance by Cache Driven Memory Management," *High–Performance Computer Architecture*, Inst. of Electrical and Electronics Engineers, Inc., pp. 234–242 (Jan. 22–25, 1995).

Prvulović, M., et al., "Split Temporal/Spatial Cache: A Survey and Reevaluation of Performance," *TCCA Newsletters*, Inst. of Electrical and Electronics Engineers, Inc., pp. 1–10 (1999).

Prvulović, M., et al., "The Split Spatial/Non–Spatial Cache: A Performance and Complexity Evaluation," *TCCA Newsletters*, Inst. of Electrical and Electronics Engineers, Inc., pp. 1–8 (1999).

Johnson, T.L., et al., "Run–time Adaptive Cache Hierarchy Management via Reference Analysis," Proceedings of the 24th Annual International Symposium on Computer Architecture, pp. 1–11 (Jun. 2–4, 1997).

Dahlgren, F., "Boosting the Performance of Hybrid Snooping Cache Protocols," Proceedings of the 22nd Annual International Symposium on Computer Architecture, Italy, (ACM Press), pp. 60–69 (Jun. 22–24, 1995).

Rudolph, L., et al., "Dynamic Decentralized Cache Schemes for MIMD Parallel Processors," The 11th Annual International Symposium on Computer Architecture, Michigan, pp. 340–347 (Jun. 5–7, 1984).

Frank, S., et al., "The KSR1: Bridging the Gap Between Shared Memory and MPPs," Digest of Papers, Comp.con93, The Institute of Electrical and Electronics Engineers, Inc., pp. 285–294, (Feb. 22–26, 1993).

Subbarao, P., and Kessler, R.E., "Evaluating Stream Buffers as a Secondary Cache Replacement," *Computer Architecture News*, 22(2):24–33 Apr. (1994).

Ramachandran, U., et al., "Architectural Mechanisms for Explicit Communication in Shared Memory Multiprocessors," The Proceedings of Supercomputing '95, pp. 1–22 Dec. (1995).

Tomasko, M., et al., "Experimental Evaluation of Array Caches," Dept. of Computer Science, Colorado State University, IEEE Computer Society Technical Committee on Computer Architecture: Special Issue on Distributed Shared Memory and Related Issues, pp. 11–16, Mar. 1997.

Sanchez, F.J., et al., "Software Management of Selective and Dual Data Caches," Dept. of Computer Architecture, Universitat Politécnica de Catalunya, IEEE Computer Society Technical Committee on Computer Architecture: Special Issue on Distributed Shared Memory and Related Issues, pp. 3–10, Mar. 1997.

Carter, J.B., et al., "Avalanche: A Communication and Memory Architecture for Scalable Parallel Computer," Computer Systems Laboratory, University of Utah, UUCS–95–022, pp. 1–22, 1995.

Juan, T., et al., "Dynamic Cache Splitting," Computer Architecture Dept., Universitat Politécnica de Catalunya, Barcelona, (Spain)(1995).

Anderson, C., and Baer, J., "Two Techniques for Improving Performance on Bus–based Multiprocessors," First IEEE Symposium on High–Performance Computer Architecture, Inst. of Electrical and Electronics Engineers, Inc., pp. 264–275 (Jan. 22–25, 1995).

Kessler, R.E., "The Aplha 21264 Microprocessor: Out–of–Order Execution at 600 MHz," Compaq Computer Corporation, Hot Chips 10, pp. 1–24, (Aug., 1998).

Milenkovic, A., et al., "Cache Injection on Bus Based Multiprocessors", Workshop on Advances in Parallel and Distributed Systems, West Lafayette, Indianna, Oct., 1998.

Jouppi, Norman P., "Improving Direct–Mapped Chche Performance by the Addition of a Small Full–Associative Cache and Prefetch Buffers", Digital Equipment Corp., Technical Note TN–14, Mar. 1990.

Gandhi, P., "SA–1500: A 300 mHz RISC CPU with Attached Media Processor", Intel Corp., Hot Chips 10, pp. 179–185, Aug. 1998.

Faanes, G., "A CMOS Vector Processor With a Custom Streaming Cache", Silicon Graphics Computer Systems, Hot Chips 10, pp. 103–109, Aug. 1998.

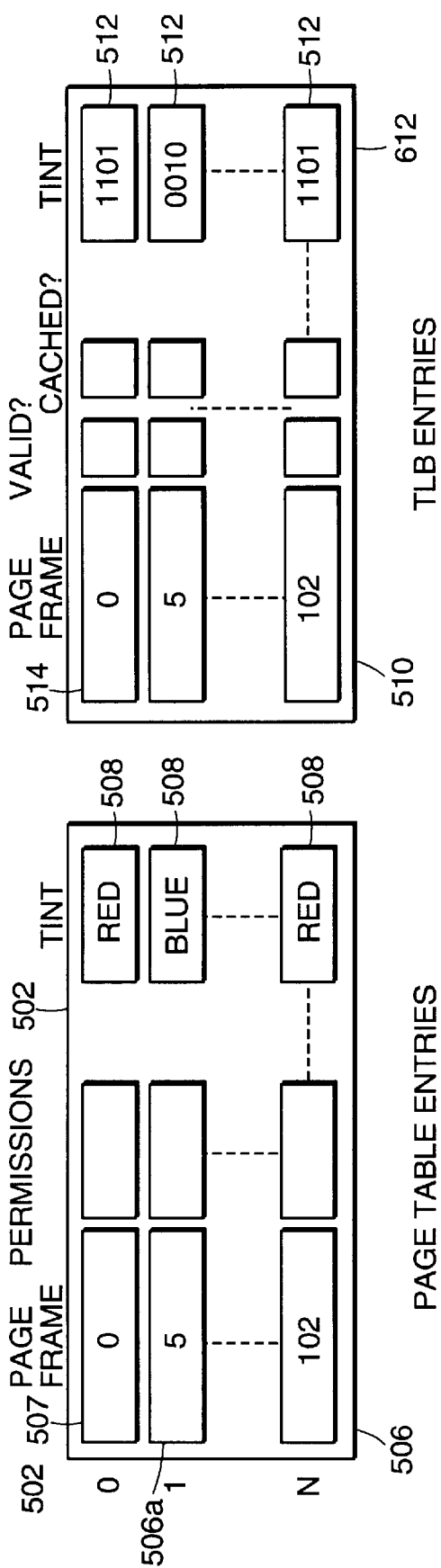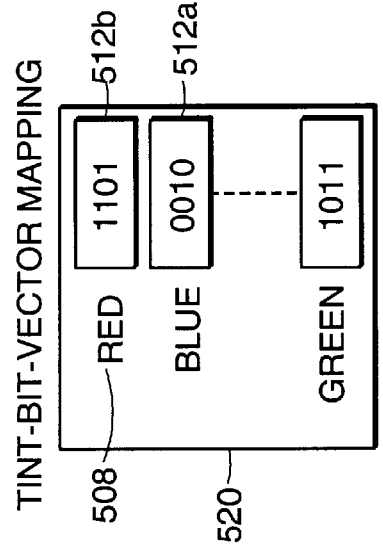
FIG. 11A
FIG. 11B

METHOD AND APPARATUS FOR CURIOUS AND COLUMN CACHING

INCORPORATION BY REFERENCE

This application relates to U.S. Provisional Application No. 60/109,207, filed Nov. 20, 1998, and U.S. Provisional Application No. 60/150,146, filed Aug. 20, 1999, the entire teachings of which are incorporated herein by reference.

GOVERNMENT SUPPORT

The invention was supported, in whole or in part, by grant number DABT63-95-C-0150 from DARPA. The Government has certain rights in the invention.

BACKGROUND OF THE INVENTION

A cache is a hardware-managed buffer designed to reduce memory access latency by copying data that is likely to be accessed in the near future into faster cache memory. In the presence of an associated cache, a device that needs to access memory, such as a processor, first looks into the cache for a copy of data from the desired memory location. If a copy is found, the device uses it, thus avoiding the longer latency of accessing memory itself. Caches can be used for both read and write memory accesses, also known as load and store operations respectively. Caches are used for both data and instructions, and a system may have multiple caches.

A cache is characterized by the following aspects of its operation:
(i) when data is copied into the cache,
(ii) how the copies are organized and stored when they are in the cache,
(iii) when a copy is removed from the cache, and the replacement policy, i.e., the rules for making room for new data being copied into the cache when the cache is already full,
(iv) virtual versus physical addressing.

A cache is also defined by a number of numerical parameters that are introduced as the behavior of a conventional cache is explained.

When a processor wants to access a memory location and looks for it in its associated cache, it may find one of three situations. One possibility is that the cache does not have a copy of the memory location, a situation known as a cache-miss. Another possibility is that the cache has a copy of the data and has the correct permission for the desired type of access. This is known as a cache-hit. In the third situation, which only arises in more complex cache designs, a copy may be present in the cache, but the cache does not have the permission to grant the desired operation, typically a store operation. In this case, the cache needs to take further actions before the desired operation can complete. This third situation is sometimes known as an upgrade.

A standard cache begins with no copies in its fast memory, and brings in data whenever a cache-miss occurs. Typically, a contiguous block of memory containing the accessed location but larger than the access size is brought into the cache. For instance, the access may be for 4 bytes of data, but a 64 byte block of memory content is copied into the cache on a cache miss. Such a block of memory is referred to as a cache-line, and once it is copied into the cache, this memory block is said to be cached.

The use of a cache produces performance gain when the same data is used repeatedly, or neighboring data brought in during a cache-miss is used soon after. The former takes advantage of "temporal locality" in the memory access pattern, while the latter takes advantage of "spatial locality". They result in cache-hits and use of the faster cache copies instead of accessing the slower memory.

A cache holds a fixed number of cache-lines entries, each containing the cached data, enough information to identify the memory address that this data comes from and some cache management state information. A standard cache is typically organized in one of three ways: (i) fully-associative, (ii) direct-mapped, or (iii) set-associative. These organizations differ in the group of the cache-line entries that can be used to store a cache-line with a particular address.

In a fully-associative cache, any cache-line entry can be used to store a copy of any memory address block. Under this strategy, checking whether a particular memory location has been copied into the cache requires comparing the address of interest against the address of every cache-line entry.

In a direct-mapped cache, a memory block with a particular address can be stored in only one particular cache-line entry. This simplifies lookup since only one location needs to be checked. Note that multiple memory blocks at distinct addresses can map to the same entry because a smaller cache has to serve a larger memory. Typically, the cache entry that is used is determined by the lower order bits of the memory block's address. In this way, contiguous cache-line granularity memory locations map to different cache entries.

The set-associative organization is intermediate between direct-mapped and fully-associative, and is actually a family of designs parameterized by the number of ways. The easiest way to think of set-associative organization is to consider an N-way set associative cache as having N direct-mapped sub-caches. Each of the N direct-mapped portion is referred to as a "way". Checking for a particular memory block requires checking the N possible cache-line entries that may hold a copy of it. These N entries are said to be in the same set, giving rise to the notion of the number of sets in a set-associative cache.

The fully-associative and direct-mapped caches are degenerate cases of the set-associative organization where the number of sets is one or the number of ways is one respectively.

A number of events can cause a conventional cache to remove a valid copy, or alter the permissions associated with the copy. Because a cache is smaller than the actual memory that it is speeding up, it is possible that when a cache-line is brought in there is no free space in the cache to accommodate it at that time. This can happen in any of the three cache organizations. For the fully-associative organization, this happens when the cache is completely full. In the direct-mapped cache, this happens when the only entry that can accommodate this new cache-line is already in use. In an N-way set associative organization, this occurs if there are already N entries in the set to which the new cache-line maps.

When new data is copied into a cache but all the possible locations for storing it are in use, one of the existing copies has to be evicted to make room for the new data. Under the direct-mapped case, there is exactly one possible entry for the new data, so the current occupant of that entry has to be evicted. In the fully-associative and set-associative cache organizations, any one of multiple entries can be evicted. In these cases, the method of selecting a particular entry for eviction is called the replacement policy. The most common policies are either a random algorithm, or a least-recently-used (LRU) algorithm.

A random replacement algorithm picks one of the possible eviction candidates at random. An ideal least-recently-used algorithm looks at when each eviction candidate was last accessed, and evicts the one that has not been accessed for the longest time. Studies have shown that for many programs, when a location was accessed recently, the same location and its neighbors, such those in the same cache-line block, are likely to be accessed again. There are of course exceptions to this access pattern, so LRU is not an optimal policy for all situations.

Some processors and their associated caches allow software to explicitly evict or alter the permissions associated with data that has been copied into the cache. This is a second way in which cache copies are removed.

A conventional cache used in a multi-processor system may also remove a valid copy, or alter the permissions associated with the copy in respond to memory accesses of other processors. In many computer systems, two or more processors each having a dedicated cache may share a common memory across a memory bus. More generally, the processor may contain additional levels of caches. For simplicity, the term "device" is used to refer to a processor that may include additional level of caches that uses a cache. FIG. 1 shows a typical system comprising devices 10, associated caches 12, shared bus 14, and common memory 16.

Many caches, sometimes called in-line caches, can be accessed from two different sides. A master side that is closer to the processor, and a "snooping" side that is closer to the shared bus. The cache receives requests for specific memory locations from the master side, and attempts to satisfy them from its cache entries. If the request misses in the cache, or the cache copy does not come with sufficient permission for the requested operation, the cache submits a request to the next level of cache via its snooping side.

An alternative to the in-line cache is the look-aside cache, which has only one interface that fulfils the tasks of both interfaces of an in-line cache. This interface shares a bus with devices and memory. In response to a device access, a look-aside cache will look inside its copies just like any cache, and indicate to the memory whether there is a cache-hit. If a cache-hit occurs, the memory does not respond to the request.

Multi-processor systems containing multiple caches have to deal with a "cache coherency" problem. Bus "snooping" is a common technique employed by caches to solve this problem. FIGS. 2A, 2B illustrate the cache coherency problem. At time T, processor A reads memory location X from memory 16, bringing the memory block 22 containing X into associated cache Ca. A little later, at time (T+1), processor B writes memory location X with a new value in block 24 of cache Cb. At this point, the copy of memory location X in cache Ca is no longer up-to-date. It is said to have become stale, or incoherent with the up-to-date value. Most useful computation models require that the stale copy in cache Ca be removed or updated to the new value. Bus "snooping" is a technique for achieving this. There are many possible specific bus snooping protocols for maintaining cache coherency. The common MESI cache coherency protocol is as an example. First consider a design that has only one-level of cache, i.e. there is one cache between each processor and memory.

The MESI protocol associates state information with each cache-line entry in a cache. There are four possible states: modified (M), exclusive (E), shared (S), and invalid (I). The semantics of these states are:

modified:
  the cache-line entry is valid; the data is modified, i.e. memory contains an older version of the data stored at this memory location; no other cache has a copy of this memory location.
exclusive:
  the cache-line entry is valid; the data is unmodified (i.e. memory contains the same data for this memory location), and no other cache has a copy of this data.
shared:
  the cache-line entry is valid; the data is unmodified and may be present in at least one other cache; the cache can allow the master side to read this copy but not write it until it has successfully requested, on its snooping side, an "upgrade" of this cache-line to exclusive state.
invalid:
  the cache-line entry is invalid; no data copy is found in this entry.

The MESI protocol maintains cache coherency using the basic idea that when a cache writes to a copy of a memory block, other caches are not allowed to keep any copy of that memory block. Furthermore, if another cache subsequently request for that memory block, the cache that has a modified copy must supply data. To continue with the earlier example, when processor B writes memory location X, the cache Cb has to obtain a copy of the memory block in exclusive state, which subsequently becomes the modified state when the write completes. Cb obtains a copy of the memory block containing X in exclusive state by making a request on the shared bus. When Ca sees this request, it invalidates its copy of X.

The MESI cache coherency protocol comes under the category of invalidation based protocol. It prevents stale copies by invalidating cache-line copies that are in danger of becoming stale. Another strategy for maintaining cache coherency is to take an update-based approach. This approach allows multiple caches to keep shared copies of a cache-line that is being written to. The key is to ensure that these copies are updated with the newer data. Update strategy is generally more complex conceptually, requiring more involved model of the memory system.

It should be noted that in multi-level cache systems, MESI protocol has to deal with more states, while using the same basic principle for maintaining coherence. As an example, FIG. 3 shows a system which has two in-line caches Ca1, Ca2 and Cb1, Cb2, respectively, between each processor (A, B) and the shared bus 14 and shared memory 16. A common design is to make Ca2 inclusive, i.e., Ca2 contains a superset of the cache-lines that are in Ca1. Furthermore, Ca2 typically keeps track of the approximate state of cache-lines that are in Ca1. This is useful because Ca2 can now act as a filter during snooping, and only propagate transactions involving cache-lines that are in Ca1 up to Ca1 for snooping. Under this design, Ca2 needs to keep state information beyond the four MESI states. In addition to indicating whether a cache-line copy 26' is also in Ca1, Ca2 needs a new state to indicate cases where Ca1 has a modified copy 26. Unless Ca1 always updates the Ca2 copy—an inefficient design—Ca2 cannot simply use the modified state as this state implies that Ca2 has an up-to-date copy of the data.

Modern computers employ multiple types of addresses to provide critical capabilities, such as protection between unrelated jobs in a multi-user environment. Typically, non system-level software manipulates what are called virtual addresses, while hardware memories are accessed using physical addresses. System software and computer hardware provide mechanisms for translating virtual to physical addresses so that access by software made with a virtual address is eventually translated into a physical address used to access memory. The reverse translation from physical to virtual addresses is often needed and provided by system software and possibly hardware.

The presence of multiple types of addresses raises the question of the type of address used to access caches. Although virtual addressing of caches has been used before, it is unpopular due to some problems unique to virtual addressing of caches. Consequently, the most common approach today is to use physical address.

Caches were originally designed to be completely transparent to user-level software, and only minimally visible to system software. In their original form, copying of data into cache was strictly under hardware control, and only happened in response to master side accesses that resulted a in cache-miss. The ability of software to remove copies from a cache was often only available to system software, and might not provide selective removal. For example, a system may only provide the ability to purge the content of the entire cache.

With the introduction of multi-processor cache coherent shared memory systems, some cache and processor designs provide software, including user-level software, with additional instructions for manipulating caches. Typical additions are the ability to request pre-fetching of data, and the ability to purge specific memory block copies from a cache. Pre-fetching capability often permits speculative pre-fetching in that the address provided may cause a memory protection violation, in which case the request is ignored.

Another kind of enhancement to traditional cache designs is the ability to lock caches. There are several flavors of locking. One kind of locking is to stop bringing new copies into the cache, so that the copies that are in the cache at the time of locking will not be evicted because space needs to be freed up. Variants include either not permitting any data to be copied into the cache, to allowing new data to be copied only if doing that does not require any eviction. Typically, snooping can still remove the content from a locked cache so that cache coherency is not violated when a cache is locked.

Cache locking is usually done on the entire cache. A much less common design is to allow progressive locking of an N-way set associative cache, one way at a time. This, while seeming interesting, is not very flexible because no means is provided for software to query the existing content of a cache, much less on a set by set basis. As a result, it is not easy for software to know definitively the content of a cache or a particular way of the cache when it attempts to lock it.

SUMMARY OF THE INVENTION

The recent additions to cache design described above, while useful, provide only limited software control over cache behavior. Existing proposals for improving software control and flexibility of cache behavior are ad hoc solutions that address only limited aspects of current cache deficiencies. In contrast, the present invention provides comprehensive and highly flexible mechanisms that can grant software a much greater degree of control over cache behavior. The benefits of the invention include, but are not limited to, overcoming the following limitations of current cache designs.

A limitation of most cache designs is that a memory block can only be copied into a cache in response to a master-side initiated access. Two exceptions—cache update protocols and read snarfing—allow snooped data to be inserted into the cache, but only if the address tag corresponding to the data is already in the cache. For an address tag to be in the cache, the master-side must have accessed data in that cache-line some time in the past. Thus, ultimately, current caches can only be filled with cache-lines containing data that has been or is being accessed by their master side device such as a processor.

Another limitation of current cache designs is that the cache replacement policy is fixed in hardware. As noted, a fixed replacement policy cannot be optimal for all programs. Current cache locking support provides software with some indirect ability to affect replacement behavior, but this is indirect, clumsy and difficult to use.

Yet another limitation of current cache designs is the fixed memory model (or in rare cases, a small number of memory models) in hardware. Because it has to operate correctly for all programs, such a fixed memory model typically has to be conservative about possible usage patterns. Oftentimes, the data sharing pattern of a parallel program permits special memory models that are sufficient for its usage, but because they are less general, these models are amenable to more efficient implementations.

Since the inception of caching, users, compilers and operating systems have become much more sophisticated in their ability to understand memory usage and could potentially manage a cache more effectively than a generic hardwired strategy. It is desirable that caches enable safe software management when appropriate, but revert back to standard hardware management when not appropriate. This represents a fundamental shift in cache design from the current practice of fixing cache control in hardware state machines that are invisible to user code, to a design that enables dynamic software control over cache behavior.

Another change that has occurred since the original introduction of caches is the shift from uni-processor systems to multi-processor parallel or distributed systems. In a multi-processor system, when a processor produces data that is consumed by another processor, it would be desirable for the data to pass from the producer directly to the consumer's cache at an appropriate time. Essentially, it is desirable to use the producer and consumer caches as a cooperative buffer, moving data pro-actively at the right time so as to reduce memory access latency and bus bandwidth consumption. This principle applies more generally to bus devices other than processors as long as they consume and/or produce data.

An aspect of the invention, referred to as "curious caching", improves upon cache snooping by allowing a snooping cache to insert data obtained from snooped bus operations on memory locations that are not currently in the cache and independent of any prior accesses to the associated memory location. In addition, curious caching allows software to specify which bus operations, e.g., reads or writes, result in data being inserted into the cache. This is implemented by specifying "memory regions of curiosity" and insertion and replacement policies for those regions. In one embodiment, a translation structure set up under software control translates a physical address seen on the bus to a virtual page having curiosity information associated with it.

Accordingly, in a system having one or more caches coupled to a shared memory through a communications medium, a method for inserting information into a particular cache includes specifying curiosity region to be monitored independent of cache content and prior access to the curiosity regions; monitoring operations with the shared memory to identify curiosity regions; and writing information from the communications medium into the associated cache. The curiosity regions can include data addresses.

In an embodiment, the specification of curiosity data addresses includes providing a translation structure having plural entries, each entry comprising a physical address and curiosity information. In monitoring the bus operations, the translation structure is accessed with the physical address of each bus operation and upon locating a matching entry, a determination is made from the curiosity information in the entry whether to write the associated data into the cache.

Curious caching is superior to pre-fetch because the consumer does not need to compute or specify exact addresses, bus bandwidth is not wasted on incorrect or poorly timed pre-fetches and the producer is allowed to essentially insert data into the consumer's cache. In addition, curious caching is more powerful than update protocols since it does not require that each update be reflected on the memory bus, thus saving on bandwidth. Curious caching also allows cache-lines that have never been read by the consumer to be brought into the consumer's cache.

In another aspect of the invention referred to as "column caching", the data cache is made partitionable under software control. That is, the placement of data brought into the cache can be restricted to particular regions of the cache under software control. A multitude of replacement policy options can also be made available with the specific one applied be chosen by software. This allows much more flexible and effective cache partitioning than that possible under conventional direct-mapped, set-associative or full-associative cache organizations. One application of this capability is that it allows a single program that uses different regions of memory in different ways the ability to isolate those regions from each other.

Accordingly, in a system having a cache and a memory, a method of managing the cache includes dividing the cache into at least two cache regions; mapping data designated by some criteria such as memory address, memory operation, or memory operation instruction address, to at least one of the cache regions; and placing that data into the corresponding mapped cache region. A replacement policy can be specified for each memory region such that the memory region data is placed into the corresponding mapped cache region using the specified replacement policy.

In a particular embodiment in which the data cache is organized as a set-associative cache, the invention provides a replacement policy that specifies the particular column(s) of the set-associative cache in which a page of data can be stored. The column specification is made in page table entries in a translation look-aside buffer (TLB) that translates between virtual and physical addresses. In the embodiment, the TLB entry is augmented to include a bit vector, one bit per column, which indicates the columns of the cache that are available for replacement.

According to an aspect of the invention, the cache comprises an N-way set associative cache, where N is a positive integer. The cache is divided into N columns and an N bit vector is associated with each memory region, each bit identifying one of the N columns. An asserted bit of the bit vector indicates that the associated data can be replaced in the corresponding column.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIGS. 11A and 11B illustrate the page table, translation look-aside buffer, and mapping of FIGS. 10A and 10B after a remapping column operation.

DETAILED DESCRIPTION OF THE INVENTION

Figure 1:
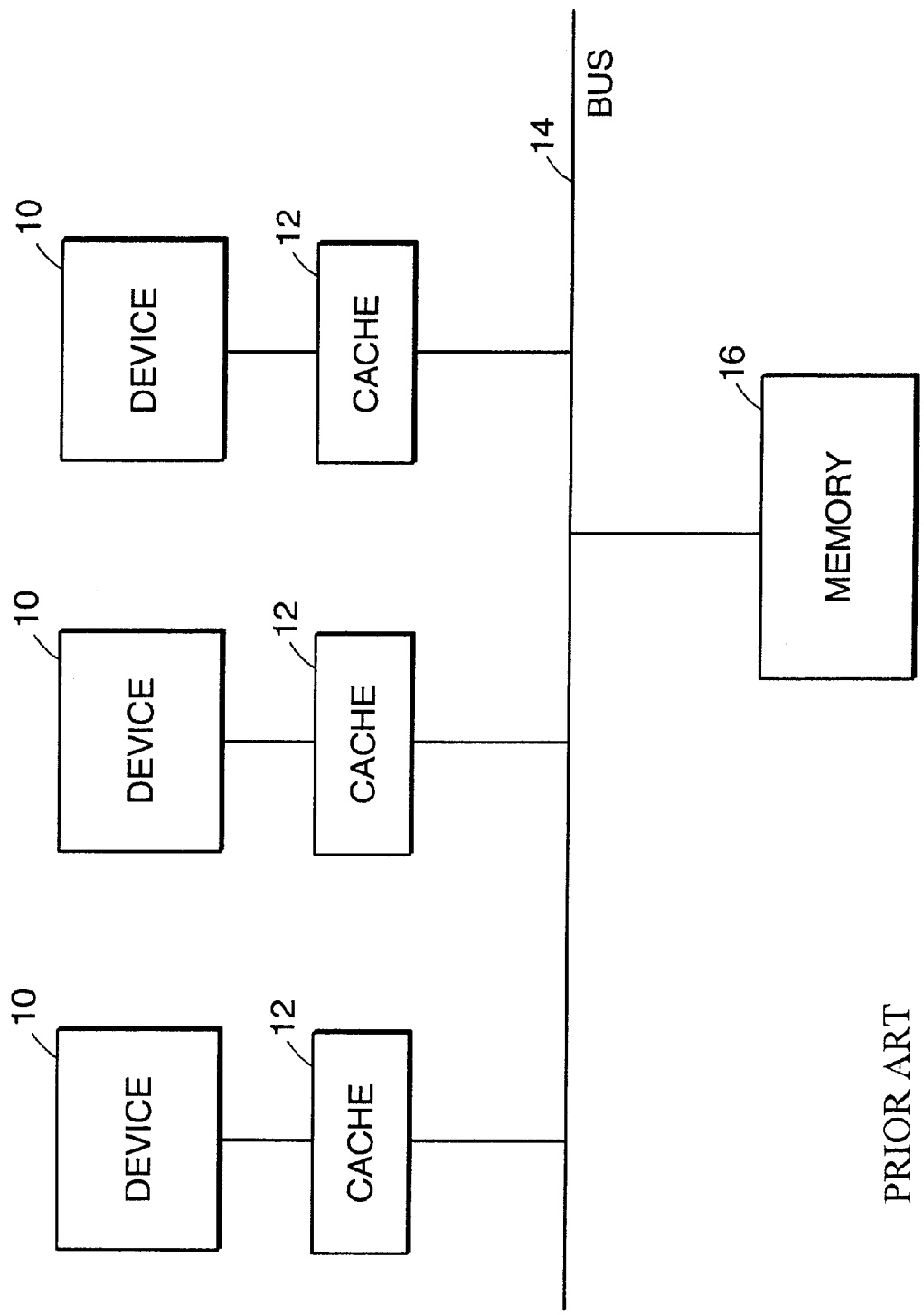
FIG. 1 is a block diagram of a prior art system of bus devices having associated caches and a common memory.
Figure 2B:
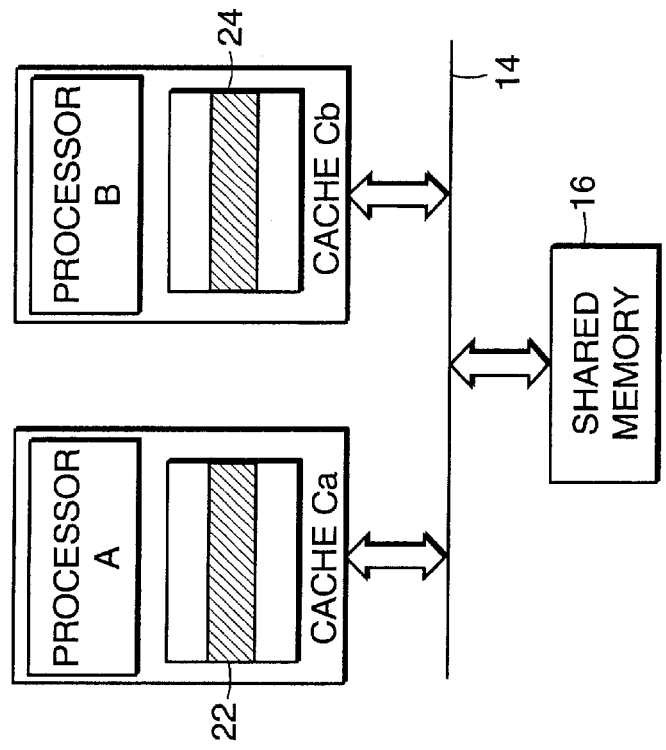
FIGS. 2A and 2B are block diagrams illustrating a cache incoherency example.
Figure 2A:
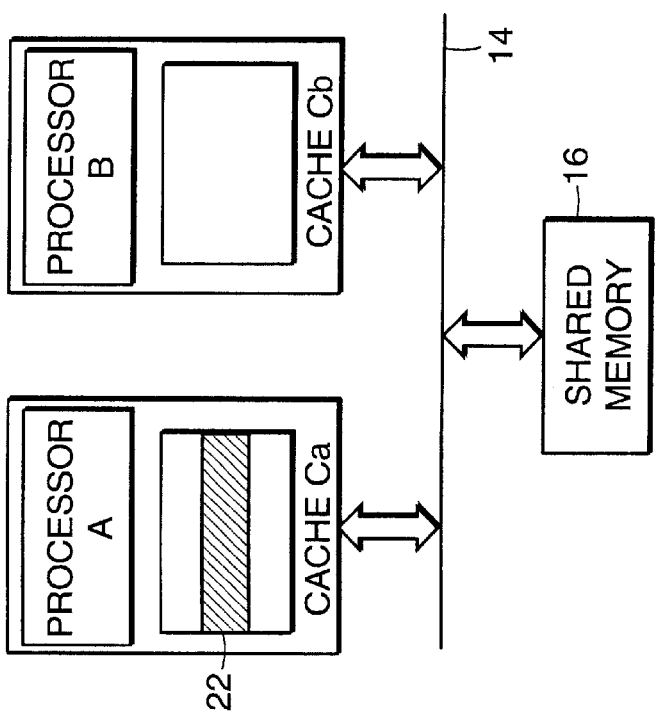
Figure 3:
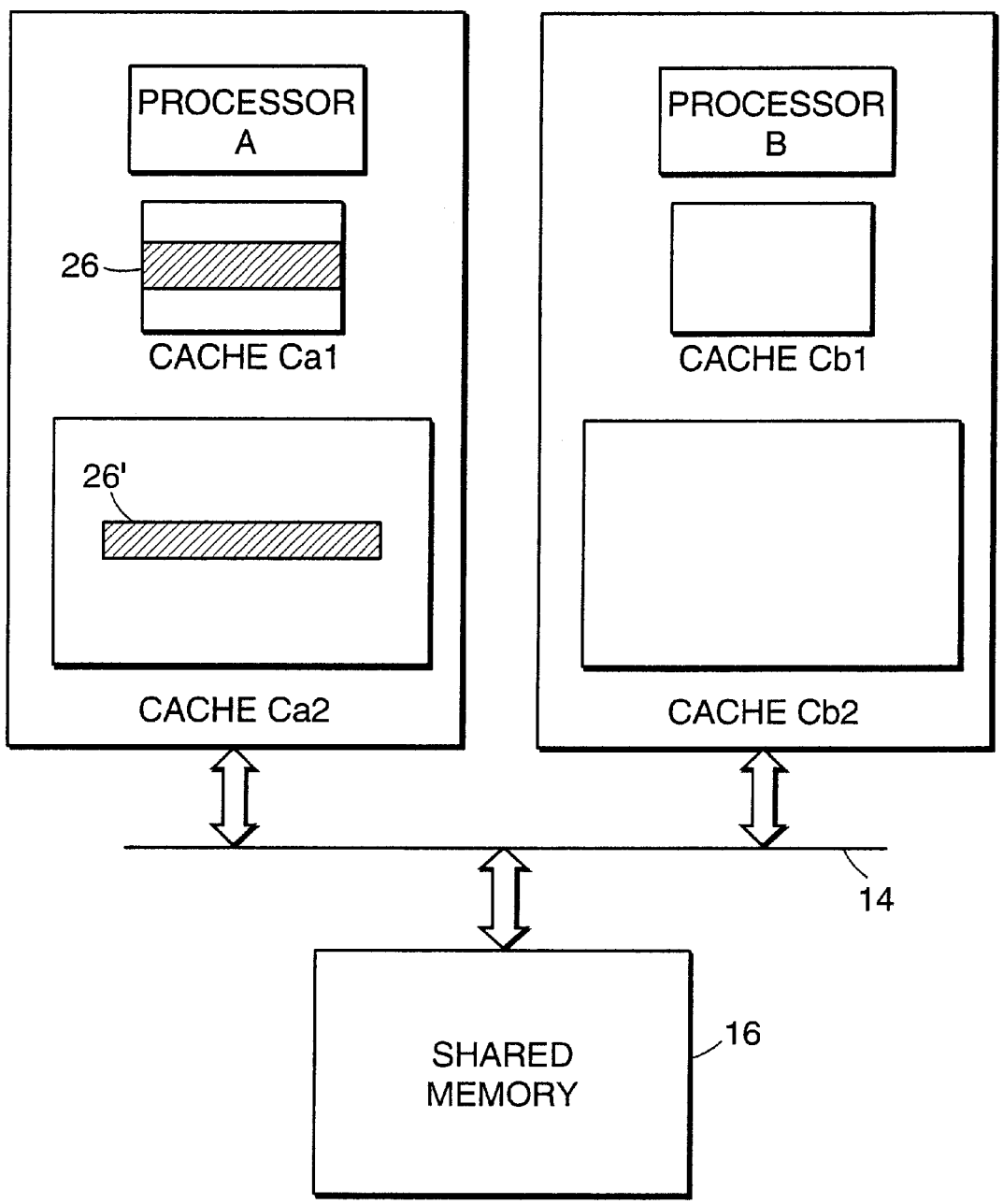
FIG. 3 is a block diagram illustrating a multi-level cache system.

The present invention provides an efficient, easy-to-implement, safe and fully compatible (backward and forward) set of cache management mechanisms which give software dynamic control over the cache. The mechanisms, referred to as curious caching and column caching, add new dynamic software control over cache behavior. This new capability allows software to define a new memory model appropriate to the usage pattern of a particular memory region. Alternatively, software can use this capability in a conservative manner to modify cache coherency protocols without modifying the memory model. Furthermore, a cache endowed with these new capabilities (or simply part of the cache) can still operate as a standard cache if so desired. In the following description, the curious caching mechanism is first described, followed by a description of column caching.

In a conventional cache, a specific cache-line (contiguous block of memory) is brought into the cache if and only if the cache master issues a request for data in that cache-line. The cache location in which the newly read cache-line resides is solely determined by cache hardware. Furthermore, the cache and bus interface hardware imposes a single coherency protocol and memory model on the system. Virtually all modern caches operate in this fashion.

The present invention provides a mechanism referred to as curious caching which allows a cache to pull-in data from bus operations snooped on its snooping side, without the master side of the cache explicitly requesting that data. This fine-grain, dynamic software control over cache behavior enables a multitude of cache coherency protocol and memory models, each fine-tuned for particular applications, to co-exist concurrently on a system.

The curious caching behavior of a cache is explicitly configured by a cache master so as to ensure fair management of resources. Clearly, a cache should not bring in all data that appears on the bus; after all, one cache's garbage is not always another's treasure.

The cache master specifies parameters, including "regions of curiosity" and replacement policies, also referred to as "policy actions", for those regions. The policy actions are specific responses by the curious cache to snooped bus operations. When a curious cache snoops operations directed to locations within its regions of curiosity, its policy action, determined by address and type of bus operation and other factors described herein, may specify bringing the data associated with those operations into the cache. It is important to note that with this feature, data that was previously not in the cache can be inserted into the cache without the master explicitly issuing a request for that cache-line.

There are many possible types of curiosity policy actions, each of which can be specified independently of the others. In an embodiment the following policy actions are provided: insertion and cache-slot selection, new permission state of the inserted cache-line and sink redirection. Each of the policy actions is described further below.

First and foremost, a curious cache according to the present invention decides whether to insert data from a snooped bus operation into its cache. One form of the policy can depend on the bus transaction address and the operation such as read or write. For example, a region of memory may be marked curious if the bus operation is a write but not if the bus operation is a read. Such a policy is useful to limit curiosity to only newly-written data.

Additional policies can exist that further refine curiosity. For example, one potential curiosity policy allows the individual specification of the coherence state (invalid/shared/exclusive/modified in the case of a MESI protocol) of data brought in via curiosity. Another curiosity policy allows the cache to specify that the data will not be written back to memory, even if that data was originally intended to be written back to memory. Yet another curiosity policy can specify where in the cache the curiosity data can reside and/or limit the number of cache-lines that class of curiosity data can consume using the column caching mechanism described further herein. Yet another policy specifies whether the cache-line should be propagated up to higher levels of the cache hierarchy as described further below. These policies and some of their uses are described further herein.

Policy actions are a function of two inputs: the entire snooped bus transaction but most often only the address and bus operation, and the current cache state. These policies are discussed further herein. Policy actions can also potentially depend on more esoteric bus transaction signals, such as the SHARED signal that indicates whether a snooping cache is caching the data in the shared state. Using such signals aggressively, however, may require an additional phase of snooping, which may be undesirable.

The following table provides an example of policy actions. Additional columns can be added to the policy table and columns can be deleted, depending on the requirements for the curious cache. Examples of possible additional columns include indications whether there is an exact address tag match which indicates a snoop hit, whether the data is write-back or write-through; whether to merge the inserted data when insertion is done to an existing modified copy of the cache-line.

| Address Range | Bus Op | Current | Insert? | Sink | New |
|---|---|---|---|---|---|
| 00400:004FF | Write | Modified | Insert | Redirect | Modified |
| 00400:004FF | Read | any | Ignore | Standard | N/A |
| 00077:00078 | Read | I, S, E | Insert | Standard | Shared |
| 00100:00101 | Write | any | Ignore | Standard | Exclusive |
| 00100:00101 | Write | any | Ignore | Standard | Shared |

Note that in region [00400:004FF], writes are brought into the cache in modified state, bypassing memory, while reads are ignored. Snooped reads to region [00077:00078] insert snooped data into the cache in Shared state if and only if a suitable cache-line that is in state Invalid, Shared or Exclusive is available. The other two regions insert snooped data into the cache in various states, replacing other data if necessary.

Generally, software will configure policies, though the software could be user-level software, system-level software or a combination of both. Depending on the individual policies supported, curiosity specification can be considered hints or imperatives.

In a base approach, curiosity hardware maps snooped addresses to a single bit indicating whether the cache is curious. Thus, every operation to a specific address is either interesting to the curious cache or uninteresting to the curious cache. This base approach is useful, but limited. For example, this scheme does not implement a queue well. If the cache region to which the queue data can be inserted via curiosity is smaller than the size of the queue in memory, data brought in by the curiosity mechanism can overwrite older queue data that has not yet been consumed. When the consumer (i.e., the master of the curious cache) attempts to read the head of the queue, it is possible that the data has been replaced by newer data that is further down in the queue.

In order to avoid this problem, curiosity can depend not only on the address of the snooped bus operation, but also on the content of the cache and the state of that content, the relationship of the cache content to the snooped bus operation, and replacement timing information. Basing replacement decisions on current cache state is standard even in conventional caches that use replacement tags and permission tags to make replacement decisions. However, with a curious cache, a particular cache state can result in curiosity hardware deciding not to be curious about a snooped bus operation, even though the bus operation address is within a curious range. Thus, in an embodiment, curiosity and replacement cache-slot selection are made dependent not only on the curiosity bit of the previously mentioned base approach, but also on the potential replacement cache-slot state.

Allowing other dynamic parameters to influence the curiosity decision can also be helpful. For example, as described earlier, in some cases caches should be curious about read data, while in other cases, caches should be curious about written data. Making curiosity dependent on the bus operation gives software code more control.

After curiosity hardware determines that it is curious about a snooped bus operation and the data is brought into the cache, the cache-line must have an associated permission tag. Rather than hard-wiring the mapping of bus operation to permission tag as is done in conventional caches, a preferred embodiment of the curious cache allows the permission tag to be a function of any or all inputs used for insertion and cache-line selection.

For example, if a bus device causes a cache pushout to occur (i.e., the master of the bus operation is removing the cache-line from its own cache), a curious cache on the shared bus could capture that cache-line in modified state, avoiding the need for memory to capture that cache-line since the curious cache will have an up-to-date copy that will be written back to memory (or another curious cache) when replaced.

A curious cache can be curious about a snooped shared read (i.e., a read to get a cache-line in shared state) and cache that cache-line in modified state using permission tag specification ability. Such an operation is useful if it is known that the reader is only a reader and the curious cache will write that data after the reader is done with the data.

Specification of policy actions can potentially introduce scenarios that appear paradoxical for conventional cache coherency protocols such as the MESI protocol. For example, if Insertion on Read into the modified state is specified, more than one cache can end up with modified copies of the cache-line. This maybe acceptable semantics given the specific software usage pattern of data in this cache-line and/or the use of merging when pulling in data into a cache with an existing modified copy of the cache-line. Researchers have proposed non-standard memory models, such as location consistency, and shown how they can be useful. Of course, software should avoid paradoxical situations, but hardware must be implemented to handle such paradoxes gracefully. It is often possible that curiosity can be restricted to reduce or eliminate any possible paradoxes, but doing so can severely limit the power of curiosity.

The sink of a bus operation is its final destination, i.e., where the data should be when the bus operation completes. In order to avoid deadlocks, there must be no cycles when going to the sink; the sink is always able to accept the data write. In modem systems, the sink is generally dynamic random access memory (DRAM), but it is possible for the sink to be another cache that is shared between two or more higher level caches. Certain aggressive caches allow cache-to-cache transfer when one cache issues a request for a cache-line of data that resides in another cache in modified state. If the read requested the data in exclusive state, the latter cache will send the data to the former cache in modified state, avoiding a writeback to the sink. If the read requested the data in shared state, the latter cache will send the data to the former cache in shared state and will also write that data back to the sink. Since the former cache is not performing a write but is returning data to the requesting cache, an operation called "cache intervention", the requesting cache is not the sink.

If a cache captures data from the bus and stores it in modified state, it is unnecessary for the sink of that data to update its state. Such an optimization is done in aggressive caches supporting intervention, but only when one cache exclusive reads (i.e., reads the cache-line in exclusive state) a cache-line of data that is modified in another cache. In a curious cache according to the present invention, such opportunities occur much more often since the data from snooped reads or writes can be brought into a cache in modified state. Thus, the ability for the curious cache to signal that it will become the sink of the data for this particular transaction is provided in the present invention. This signal is passed to the real sink and causes that real sink to avoid updating its state for that bus operation. Sink redirection can be ignored by the sink but it does slightly alter curious cache memory semantics by potentially writing back modified data that another cache is storing in modified state via curiosity. For example, assume a data cache clear instruction is provided on the memory bus. Such an instruction clears a cache-line without writing it back. If a curious cache brings in the data from a snooped bus operation and asserts sink redirection, but the sink still updates itself, and the data cache clear instruction is used on the cache-line, the next read of the same data will get potentially different data than if sink redirection is supported.

Sink redirection and permission tag specification allows the cache to act as a memory to specified regions of the address space. To create a memory within the cache, the cache should have curiosity set for that region of the address space, specify modified state (unless the bus operation is an exclusive read) for data in that address range inserted by curiosity and redirect the sink when curious data is inserted.

In computer systems, there is often a hierarchy of caches. There can be many levels of caches. For example, a first level, or L1 cache, is the smallest cache and located closest to the processor while a second level, or L2 cache, is larger and located further away from the processor. Most often the L2 cache is inclusive of the L1 cache, that is, all cache entries in the L1 cache are also in the L2 cache entries. Note that the term inclusive refers to the address region and permissions of the cache rather than the data itself. An L1 cache can have more up-to-date data than the L2 cache, for example, but both should indicate that a particular location is cached and that the cache hierarchy has exclusive ownership of the cache-line. Alternatively, the caches can be exclusive, in which case a data item present in the L1 cache does not necessarily imply that the data item is also in the L2 cache.

Hierarchical caches offer additional challenges to curious caches. If the cache hierarchy does not provide filtering, that is, all caches see all bus operations, then curious caching works with no modifications. If the cache hierarchy is filtered, that is, a bus operation seen by an upper level or "descendant" cache may not be seen by a lower level or "ancestor" cache, then some additional support is needed.

The simplest way to support propagation is to include a propagation bit associated with each address range indicating whether an ancestor cache is potentially curious. If the bit is asserted, then the operation is propagated upwards. Clearly, if additional parameters are specified beyond the address ranges, fewer bus operations will need to be propagated. However, since curiosity will probably depend on cache state, ancestor cache state must be duplicated in descendant caches to achieve full filtering.

Another possible way to support propagation is to require all descendant caches to be curious about all the regions which their ancestors are curious about. Such a scheme avoids the need for the propagation bit. If a cache observes a bus operation to an address region it is curious about, it forwards that bus operation to its ancestor caches as well. If the cache hierarchy is inclusive, the curiosity policies within the cache hierarchy also need to be compatible. For example, if an ancestor cache is curious about read data to a specific address region, its descendant cache must be as well. Having insertion based on parameters other than address complicates propagation rules, but it is always possible to play it safe and avoid propagation if curiosity is considered a performance enhancement rather than required for correctness.

Having described how a curious cache can affect its own cache state and how it can respond to the snooped bus operation, an embodiment of a curious cache is now described.

Figure 4:
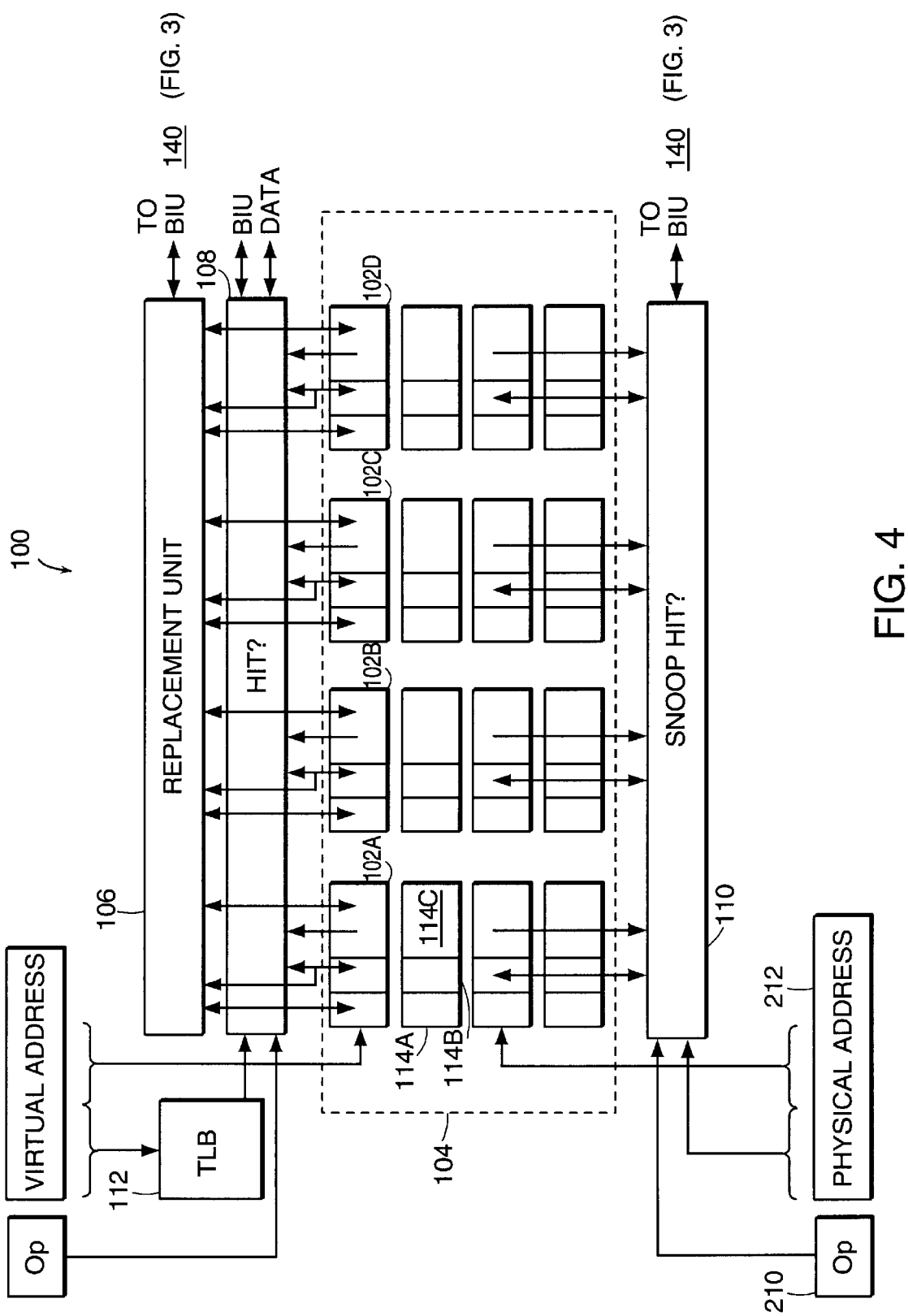
FIG. 4 is a block diagram of a standard snoopy cache.

A curious cache can be implemented by modifying a conventional snoopy cache. A block diagram of the address part of a standard snoopy cache 100 is shown in FIG. 4. The standard snoopy cache 100 includes a cache portion 104, a replacement unit 106, hit compare logic 108, snoop hit compare logic 110 and translation look-aside buffer (TLB) 112. The cache portion 104 is shown as a set-associative cache having sets of blocks or cache-slots 102A, 102B, 102C, 102D. Each cache-slot includes a permission tag 114A, an address tag 114B, and data field 114C.

Figure 5:
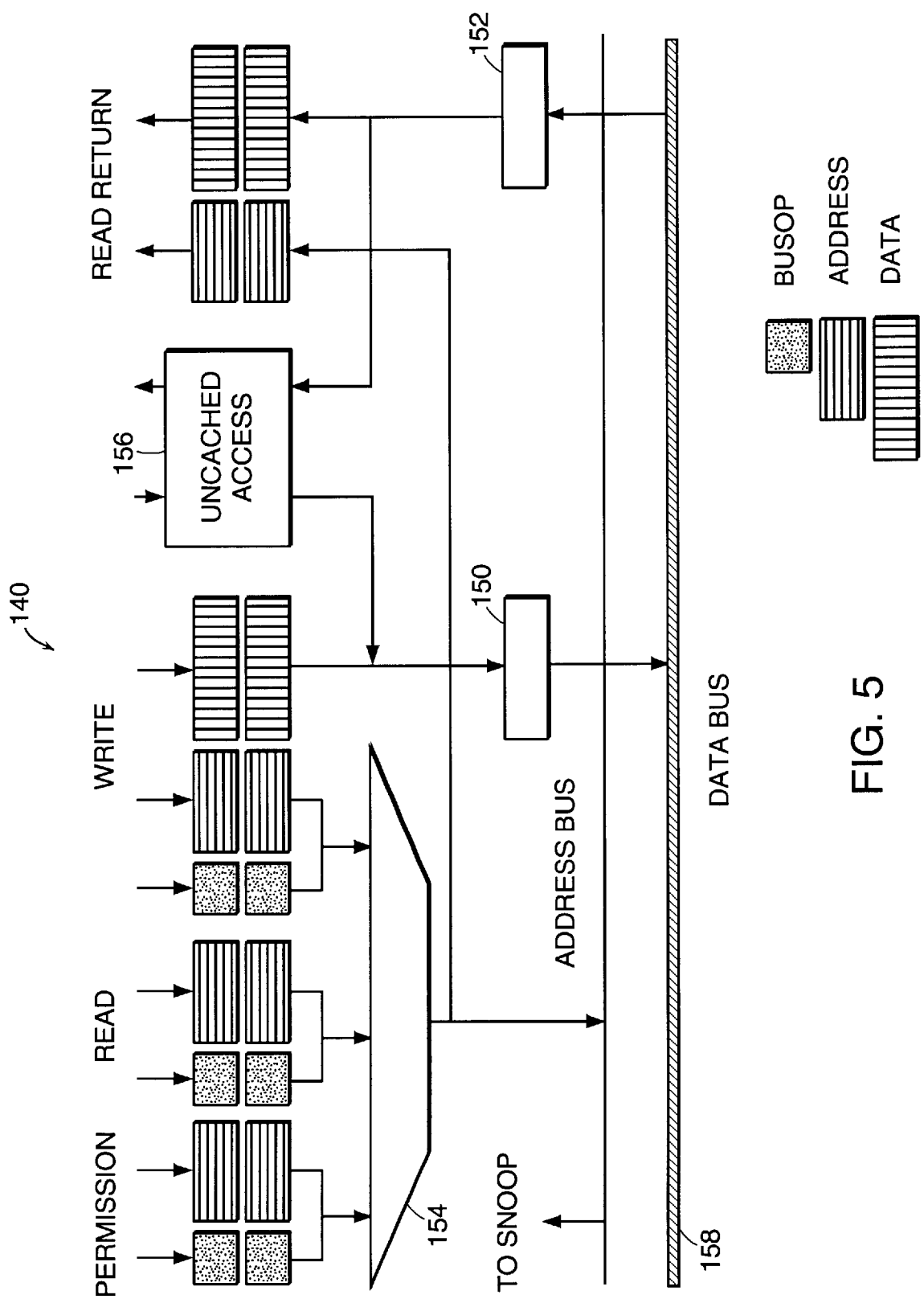
FIG. 5 is a block diagram of a portion of a standard bus interface unit shown connected to a memory bus.
Figure 6:
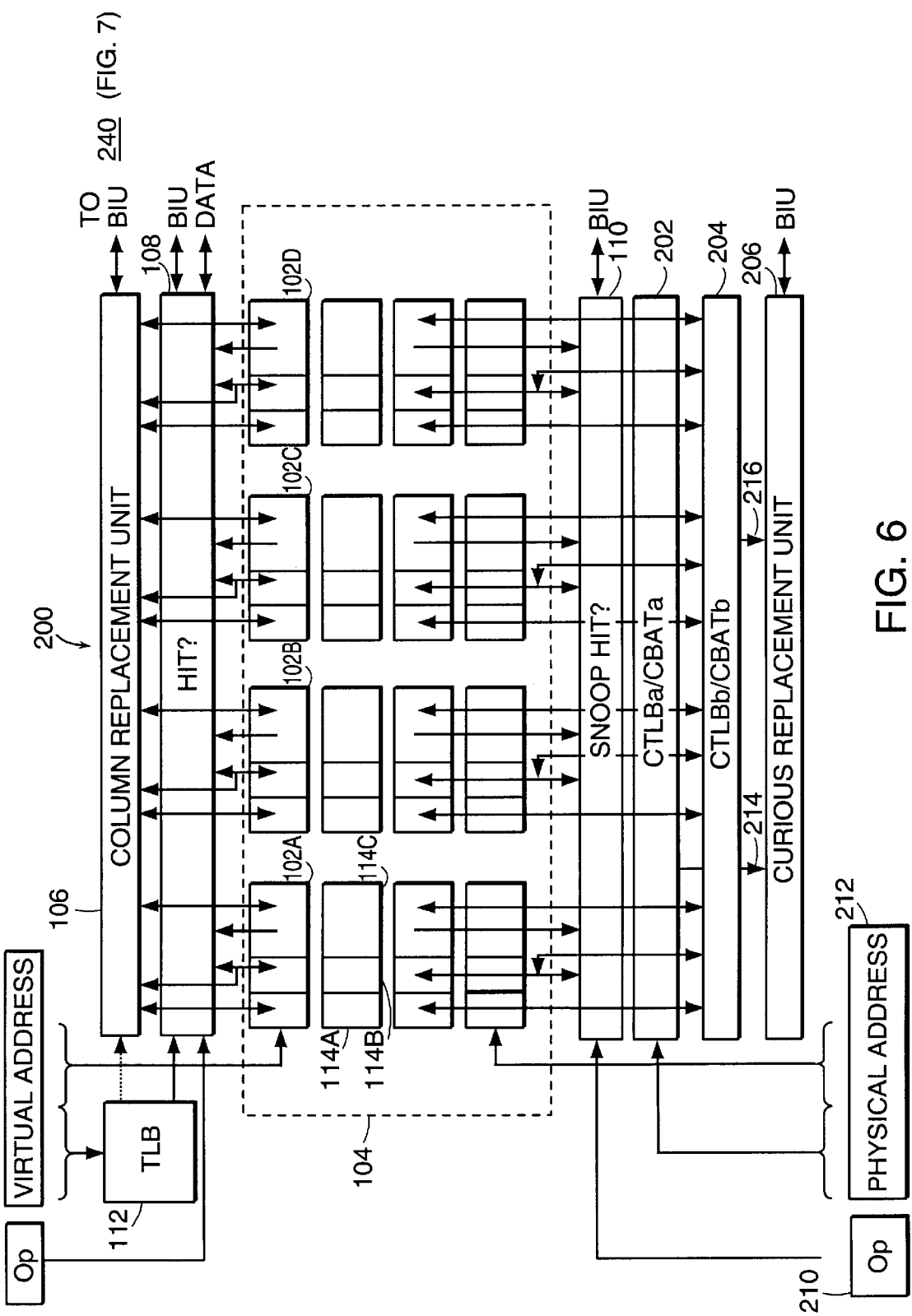
FIG. 6 is a block diagram of a curious cache in accordance with the present invention.

Hardware support for curious caching includes three basic functions: determining whether the cache should be curious about a particular bus operation, informing the bus of the decision (if necessary) and incorporating the data brought in by the curiosity mechanism. A block diagram of the address part of a preferred embodiment of the curious cache 200 according to the present invention is shown in FIG. 6. The major structural difference between the conventional cache (FIG. 4) and the curious cache is the addition of two curiosity translation look-aside buffer/block address translation (CTLB/CBAT) units, referred to as CTLBa/CBATa 202 and CTLBb/CBATb 204, respectively, and a curious cache replacement unit (CRU) 206. The CTLB/CBAT, if desired, can support non-contiguous regions of memory, such as strided regions of memory, as well as variable granularities. In addition, as described further herein, bus interface unit (BIU) 140 (FIG. 5) is modified to indicate the curiosity of its associated cache and to accept curiosity data.

The two CTLB/CBAT units 202, 204 provide information that is used by the CRU 206 to determine if the cache is curious about a snooped bus operation. The CTLBa/CBATa 202 produces curiosity information about the snooped bus operation and the CTLBb/CBATb 204 produces curiosity information about the cache-lines that could be replaced by the curious data. In an embodiment, CTLB/CBAT entries are written by software. Two stages of CTLB/CBAT are used within a particular embodiment because the CTLBb/CBATb 204 lookup cannot occur until after the address and permission tags are read for the snooped operation. The curiosity information generated by the CTLB/CBAT units 202, 204 and the potential replacement cache-lines are passed to the CRU 206 that determines whether the cache 200 is curious about a particular bus operation and, if so, the manner in which the cache is curious.

Figure 7:
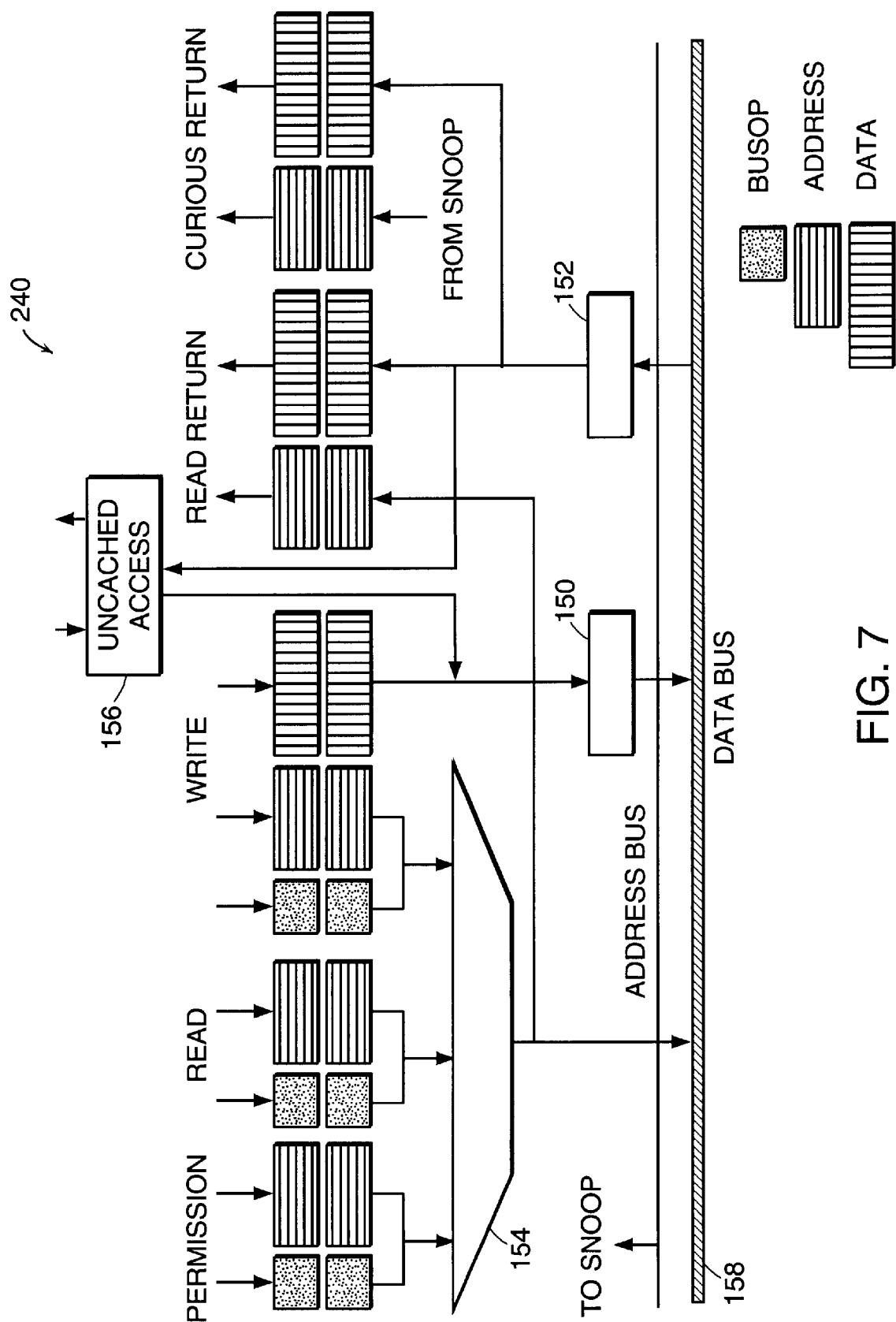
FIG. 7 is a block diagram of the bus interface unit of FIG. 5 modified to embody the curious cache feature of FIG. 6.

A snooped bus operation (i.e., operation 210 and associated physical address 212) is processed as follows. The CTLBa/CBATa 202 is accessed in parallel with the standard snooping read of address and permission tags as described above in relation to FIG. 4. The information produced by the CTLBa/CBATa 202 is passed to the CTLBb/CBATb unit 204 along with the address tags, permission tags and replacement tags read for normal snooping. The CTLBb/CBATb unit 204 accesses its internal structures to determine curiosity information about the cache-lines that potentially could be replaced by the curiosity data and passes that information to the CRU 206. The CRU then uses information from both CTLB/CBAT units to determine whether the cache is to be curious about the bus operation and, if so, the curiosity actions with respect to that bus operation. If the CRU 206 determines it is curious about a snooped bus operation, then it notifies the BIU 240 (FIG. 7) of that fact. The BIU 240 notifies the bus 158 that its cache is curious (if necessary) and coordinates moving the curious data into the cache 200 when the data becomes available.

The following describes how the curious caching feature of the present invention is provided in greater detail.

The CTLB/CBAT 202, 204 and the CRU 206 together determine the curiosity action for each snooped bus operation. The CTLB/CBAT stores and provides access to curiosity information. The entries of the CTLB/CBAT initially can be set and later reset either by extending the standard TLB entry operations or by memory-mapped operations. The latter provides the ability for other processors to set the CTLB/CBAT entries. As noted above, the CTLB/CBAT is divided into two parts: the CTLBa/CBATa 202 and the CTLBb/CBATb 204. The three units, CTLBa/CBATa 202, CTLBb/CBATb 204 and CRU 206, form a three-staged pipeline which is described further below.

The CTLBa/CBATa 202 takes snooped physical addresses 212 and their associated bus operations 210 as inputs and produces the associated policy bits which include, for example, whether the cache is potentially curious about the page frame, and the replacement strategy if any. In the preferred embodiment, each address range is a single page; no range can be smaller than a page and ranges that consist of contiguous pages are maintained as several individual page entries. Such functionality is very similar to that of the standard TLB 112, i.e., a table that maps virtual pages to their physical page frames. However, the CTLB/CBAT 202, 204 is a reverse TLB with curiosity information as its entries. Although similar in design and function as a TLB, the CTLB/CBAT units 202,204 are physically distinct in the preferred embodiment of the present invention and can contain information about different regions of memory than are contained within the TLB at any given time.

It can be helpful to have separate structures for the CTLB/CBAT 202, 204 and the TLB 112 not only for ease of implementation but also for additional flexibility. For example, a cache can be curious about an address that it has not yet mapped into its TLB 112 or can have a different column bit vector, described further herein, for data brought in via the curiosity mechanism than data brought in under explicit master memory operations.

The CTLBa/CBATa 202 is referenced whenever the curious cache snoops a bus operation. The physical page address 212 of the address on the bus along with the bus-operation itself 210, are used as an address to access the CTLBa/CBATa 202. The CTLBa/CBATa responds, indicating whether the address-operation pair is present in the CTLBa/CBATa and providing bits that specify a curiosity policy. These policy bits, along with the cache status bits that are read for standard snooping are sent to the CTLBb/CBATb 204 to determine the exact curiosity actions. It should be apparent that if the CTLBa/CBATa determines that it is not curious based on the bus transaction alone, there is no need for the CTLBb/CBATb stage to be involved. Again, the preferred embodiment implements the CTLBa/CBATa lookup in a manner similar to standard TLB lookup, which is generally handled as a set-associative cache mapping addresses to data.

Determining whether the cache 200 is curious about a particular bus operation may require determining whether the potentially replaced data is also within a curious region and, if so, what are its specifications. For example, in order to implement a first-in-first-out buffer (FIFO) within the cache, curious data should not be able to replace cached curious data from the same address region. To determine the state of the cache, the CTLBb/CBATb 204 generates curiosity information about cache-lines that are already in the cache but that may be replaced by the data from the snooped bus operation. The CTLBb/CBATb 204 accepts as inputs address, permission and replacement tags from the standard snooping unit 110 along with bus operation curiosity information 214 from the CTLBa/CBATa and generates curiosity information 216 about the cache-lines that could potentially be replaced. Thus, there are potentially multiple accesses to the CTLB/CBAT structure 202, 204, requiring a lookup-table for each possible lookup that could occur simultaneously. The generated information 214, 216 is passed to the CRU 206 to make final curiosity action decisions.

The second CTLB/CBAT access provided by CTLBb/CBATb 204 gives more information about the potential replacement cache-lines, giving the user more replacement options. Though useful, these options are not necessary to implement basic curious caching. There are performance concerns about having additional stages that must be processed before specific bus signals can be asserted. These concerns are addressed briefly below.

Rather than performing an additional lookup within the CTLBb/CBATb 204, additional bits can be added to the address component of the cache that indicate whether the cache-lines are within a curious region and, space permitting, in which curious region they reside. Essentially, the information read from the CTLBb/CBATb 204 can be stored in the cache along with the standard tags and data. Such a design has the advantage of avoiding the need for an extra pipeline stage and thus reduces timing concerns, but may require more bits and support to handle changing curiosity mappings.

The CTLBb/CBATb 204 contains nearly identical information to the CTLBa/CBATa 202 and can be implemented as an additional series of CTLBa/CBATa accesses. Such a design eliminates the need for the CTLBb/CBATb 204 but still contains the required access time. There is likely to be no performance difference between this design and one that contains a CTLBb/CBATb 204 since the bus generally runs slower than the cache, giving the cache additional cycles to perform the lookup. Such a design, however, potentially complicates the data path.

The CRU 206 takes the information 214, 216 generated by CTLBa/CBATa 202 and CTLBb/CBATb 204 and produces curious actions such as (i) whether the cache should be curious about the snooped bus operation, and (ii) how the cache is to incorporate the data. These latter actions can include determining the cache location to insert the curious data (cache-slot selection) into, the permission tag for the curious data (permission tag specification), whether to block the data from going to DRAM if the snooped bus operation is a write operation (sink redirection) and whether to propagate the curious bus operation to ancestor caches (propagation). Finally, the CRU 206 determines the information to be passed back to the snooped bus operation.

In an alternate embodiment, the output of the CTLBa/CBATa 202 can be fed into the CTLBb/CBATb 204 in the form of a table index. The CTLBa/CBATa 202 provides a lookup using bus transaction information to generate a table index that is passed to the CTLBb/CBATb 204 in addition to the read cache state. The corresponding table is accessed in the CTLBb/CBATb 204 with cache state information to generate a set of curiosity responses. In order to enable multiple columns to access the table simultaneously, the table can be either duplicated for each column or be multi-ported. This embodiment can potentially eliminate the need for a CRU 206 and therefore one pipeline stage.

The CRU 206 generates a signal indicating whether the cache should insert the data from the snooped bus operation, and if so, into which cache-slot the new data should be inserted. This information is fed to the BIU 240 shown in FIG. 7. The BIU 240 buffers necessary information, informs the bus 158 of the decision of the cache and actually brings the cache-line into the cache and puts it in the right place. If BIU buffer space is unavailable, the snooped bus operation can either be retried or can be allowed to continue, making the cache not curious for that particular cache-line.

The BIU 240 is similar to the BIU 140 (FIG. 5) except that it has been modified to provide (i) additional signals to the bus 158 to convey necessary curiosity information and (ii) the hardware needed to handle the incoming data due to curiosity. Both are straightforward.

A preferred embodiment assumes a simple in-order broadcast-based data bus. Alternate embodiments which accommodate out-of-order, point-to-point network-based data buses are described below.

In an embodiment, only $MODIFIED_{13}$ P one-bit bus signal indicating sink redirection needs to be added. When asserted, this signal indicates that the data resides in modified state within the cache, eliminating the need for memory or another cache to keep a copy of the data. Similar functionality is already incorporated in high-performance buses that support intervention such as the Motorola PowerPC 6xx product line. In those cases, the signal indicates that the cache-line will be passed from a snooping cache that contains the cache-line in modified state to a cache that is requesting an exclusive copy of the cache-line. The sink (generally the memory), therefore, is not required to make a copy, since the requesting cache has the most up-to-date copy and will ensure that the cache-line is either written back or passed to another exclusive read.

The MODIFIED_P signal can be implemented as a bus signal that is asserted only if a cache will take a copy, otherwise it remains in tri-state. If point-to-point electrical characteristics are desired, a combining circuit can be used. The combined signal is seen by memory as an input.

When the CRU 206 indicates that the cache is curious about particular data and passes that intention to the BIU 240, the BIU must allocate a buffer to store the related information until the data returns. This buffer, called a curious buffer, is virtually identical to a standard read buffer. A curious bus operation can be thought of as a read that has been initiated by another bus device. For the curious bus operation, the same master-side collision detection mechanisms used in the conventional cache 100 (FIG. 4) are invoked to prevent ancestor caches from issuing loads to the same cache-line. The curious buffer must be able to handle a retry of the curious bus operation at a later time, if the bus protocol supports it. The only differences are that completion of the bus operation does not necessarily signal to an outstanding load or store that it can continue and that the cache does not have to provide snoop-side collision detection since the bus device originating the bus operation presumably does so.

When the curious data appears at the BIU 240, the BIU moves the data into the cache 200 (FIG. 6) when possible. If the cache master had issued a memory operation to the same cache-line and the permissions are correct, it is possible to service that memory operation with the curious data as if the memory operation issued the curious bus operation.

If data travels over a point-to-point network rather than a bus, such data will not normally be available to a curious cache. One possible solution is to add another bus signal, $CURIOUS_{13}$ P, that indicates to the data network that a copy of the data should also be sent to the curious cache. The data network will have to support this functionality. Another possible solution is for the curious cache to submit its own memory access to get the data. Such a solution consumes both address bus bandwidth and data bus bandwidth and increases latency but eliminates the need for additional network support.

The point-to-point data network must also be able to handle the $MODIFIED_{13}$ P line instructing the memory to ignore the data if the signal is asserted. Again, this signal can be ignored at the cost of slightly different memory semantics.

Out-of-order data bus/networks are also becoming more common. Typically, bus operations in an out-of-order system may include a tag that is attached to data when it is returned. Handling out-of-order data tags for curiosity data is exactly the same as if the cache issued the bus operations itself. It must store the tags it snoops and match against those stored tags with the tag delivered with the data.

Curious caching snooping operations occur in parallel with standard snooping. However, such operations potentially take a bit more time than standard snooping because an additional lookup (i.e., CTLBb/CBATb 204, FIG. 6) takes place before curious snooping can complete, and deciding on actions is potentially a bit more complex. If the timing impact of the CTLBb/CBATb 204 is too large, the information it generates can be made part of the cache lookup and additional support to flush or change that information when curiosity changes can be provided.

Since caches generally run some 2 to 5 times faster than the buses they snoop, there is generally ample time to perform such operations when the cache is snooping a bus across a chip boundary. If the cache is snooping traffic that is being generated on the same die, additional pipeline latency may occur. If the additional latency is significant, curiosity can be asserted eagerly. During the time that the data is being returned, the curious cache can determine for certain whether the data will be inserted into the cache.

A block pushout capability is highly useful for curiosity. Software marks a region of memory as "indifferent", that is, it indicates that the region of memory will not be useful to it in the near future. Hardware slowly (or quickly depending on specification from software) pushes the data out of the source cache. Doing so moves data more quickly onto the memory bus and into any destination curious caches.

Curious caches are designed to work well with the column cache feature described further herein. It is believed that caches that support both curiosity and columns perform better than caches that support only one. Depending on replacement policy, a curious cache has the potential of polluting itself with unneeded data. If the region of curiosity is limited to a specific column or set of columns, such pollution is effectively contained.

Adding instructions that can detect if a cache-line is present allows software to avoid polls to the memory bus if the producer has not yet pushed out the desired cache-line. Such instructions are most useful if it is guaranteed that the cache-line will appear in the cache. Such a guarantee is possible with column caching.

Having described the curious caching feature of the present invention, the column caching feature is now described.

Figure 8:
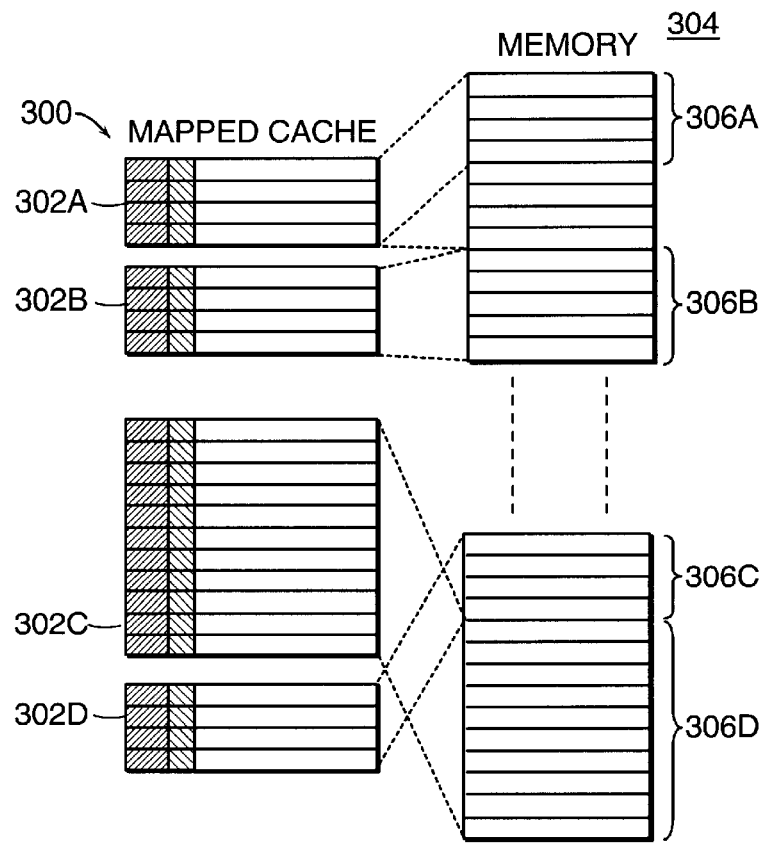
FIG. 8 is a block diagram of a mapped cache in accordance with the present invention.

The present invention allows software, firmware or hardware to dynamically restrict data to some subset of the cache and to dynamically specify a replacement algorithm for use with that subset. This general ability is referred to herein as "cache mapping". An illustrative example of such a mapping is shown in FIG. 8. In this example, a cache 300 is split into four regions 302A, 302B, 302C, 302D, such that regions 306A, 306B, 306C, 306D of memory 304 can be mapped to one or more of the cache regions 302A–302D. The mapping of memory to cache also specifies the replacement algorithm used, if one is necessary, as described below.

There are many ways to implement cache mapping. Perhaps the simplest forms of cache mapping, referred to herein as "column caching", rely on set-associative caches. A simple form of column caching makes each "way" of a set-associative cache a column. The cache is checked for a hit in the standard fashion. In the case of a cache hit, data is returned in the standard manner. In the case of a cache miss, however, the replacement cache-line is determined using the standard replacement strategy but also taking into account cache mapping information. For example, mapping information may indicate to place specific data only into a specific cache column.

Thus, the cache can be partitioned with no changes to the common-case cache-hit path. Only changes to the replacement unit and with an addition of the ability to read or generate the mapping information are required. Since it is likely that the actual reading of the desired data in the event of a cache miss will take several cycles and the determination of the replacement cache-line can proceed in parallel, the replacement decision can take several cycles without increasing processing latency. Thus, replacement is very unlikely to be on the critical path, even with the additional logic needed to implement column caching replacement algorithms.

A simple way to specify mapping information for such a column cache is to specify which cache-lines in the set (each cache-line in a set corresponds to a distinct column) are candidates for replacement. A bit vector, one bit per column, is sufficient to represent every possibility. Using a bit vector rather than specifying a single column does consume more bits, but allows data to reside in multiple columns within the cache, thus supporting associativity even with a partitioned cache. Such a column cache can be made to revert back to the standard n-way set-associative cache from which it was derived by simply mapping all data to all columns.

A simple way to generate bit vectors assumes each column is exactly one page frame in size and that the mapping criteria is based solely on which page of memory the requested data resides in. Under these assumptions, the bit vectors can be stored in page table entries and cached, along with other page information, in the translation lookaside buffers (TLBs). When a memory request is made, mapping information is read from the TLB along with translation information. That information is passed to the replacement unit to restrict where the newly-read data can be inserted. In this case, the bit vector is associated with a physical page frame that can be associated with one or more virtual pages. Thus, virtual pages can be mapped to bit vectors.

Thus, in an embodiment, a column cache is provided by modifying a standard set-associative cache, making each bank of the set-associative cache correspond to a single column within the cache. Thus, all columns are functionally equivalent; each column can contain any cache-line. During replacement, rather than being able to choose a replacement cache-slot from any of the banks, the bit vector restricts replacement to specific columns. If a bit corresponding to a specific column is asserted, that column is a candidate for replacement.

Figure 9:
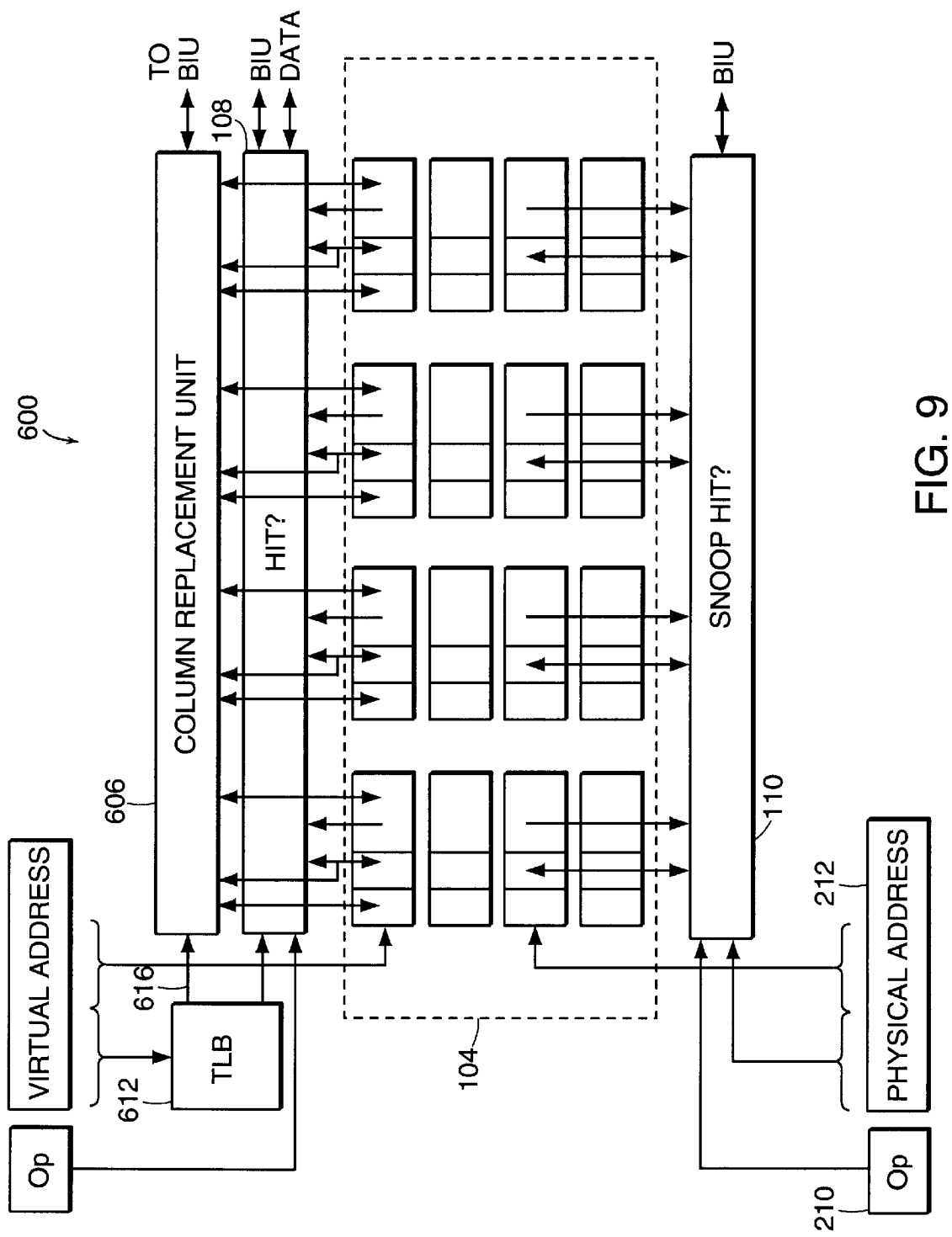
FIG. 9 is a block diagram of a column cache in accordance with the present invention.

Referring now to FIG. 9, a column cache 600 is shown. The column cache 600 includes a column replacement unit 606 and a TLB 612. Upon a memory operation, the TLB 612 is accessed and the read bit vector is passed to the replacement unit 606 via a path 616. The replacement unit is modified to use the bit vector when making replacement decisions.

Thus, with two fundamental modifications, a conventional set-associative cache can be modified to become a column cache. The first is to incorporate mapping information, allowing it to be set and read or generated and passed to the replacement unit. The second is to modify the replacement unit to be able to use that information.

Though storing bit vectors within page table entries is convenient, doing so increases the expense of remapping data from one region of the cache to another. For example, starting from a mapping where all pages are mapped to all columns (the standard set-associative cache) and then mapping one page to a single column and all other pages to the remaining columns requires that all pages table entries be updated.

One way to partially address this issue is through a level of indirection. Rather than store bit vectors within page table entries, a memory region category, called a "tint", is stored instead. The tint is mapped to a bit vector, either at the time page table information is read into the TLB or every time the TLB is accessed. The first approach stores bit vectors in TLB entries, and requires that corresponding TLB entries either be updated or flushed when a tint is remapped to a new bit vector. This approach potentially requires all TLB entries, but no page table entries, to be updated or flushed on a remap. The second approach uses a translation unit between the TLB and the replacement unit which translates the tint stored in the TLB to a bit vector dynamically. In either case, mapping a memory region to a different tint (retinting) requires modifications to corresponding page table entries and either updates or flushes to the corresponding TLB entries.

Figure 10A:
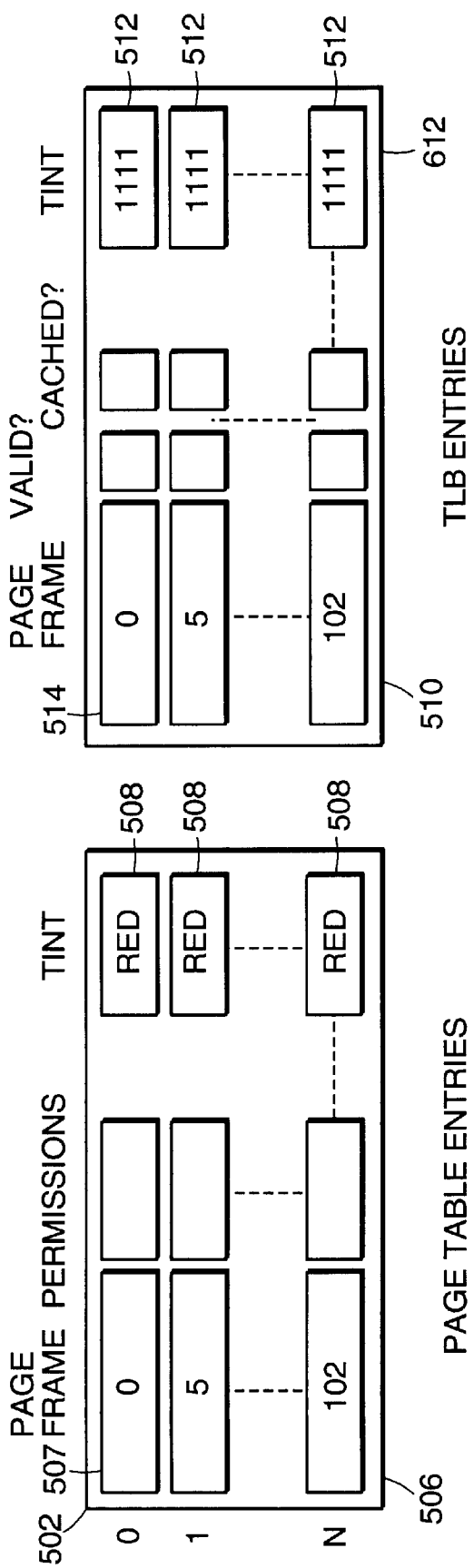
FIG. 10A illustrates page table and translation look-aside buffer entries in their initial state.
Figure 10B:
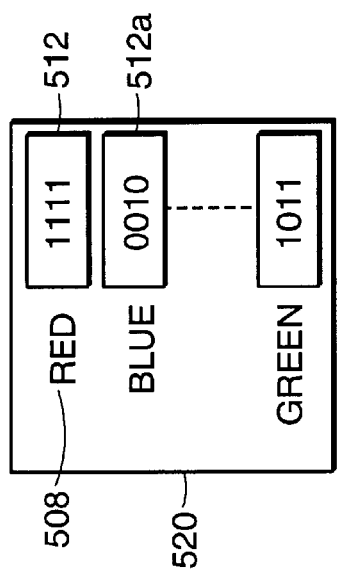
FIG. 10B illustrates a mapping of column subset numbers to bit vectors in the initial state of FIG. 10A.

The first tint mapping approach is illustrated in FIG. 10A. Page table entries 506 store a tint 508 for each page frame 507 while TLB entries 510 store bit vectors 512 for each page frame 514. Each tint 508 is associated with a bit vector specifying zero or more cache columns. The association or mapping, as shown in FIG. 10B, is dynamic and can be changed. TLB entries 510 are filled with data read from the page table entries 506. When tints are part of page table entries, the bit vector 512 corresponding to the tint 508 is then looked up in mapping 520 (FIG. 11B) and inserted into the TLB 612.

If a tint-to-bit vector mapping changes, the TLB entries 510 which contain pages mapped to that tint either need to be flushed or the bit vector 512 needs to be updated. The page table entries 506 need not change. Since the number of TLB entries 510 is much smaller than the number of page table entries 506, such a scheme reduces the number of changes that need to be made. If a page is moved from one tint to another, the page table entry 506 needs to change and the corresponding TLB entry 510 (if any) needs to be changed or flushed.

Referring further to FIGS. 10–10B and FIGS. 11A–11B, an example of such mapping changes is now described. In the page table 502, all pages 507 start with the default tint, red. In order to give one page its own column, the tint of that page is changed to blue. This is shown in page table entry 506A (FIG. 11A). The tint maps to a bit vector 512A (FIG. 11B) that allows that page to be cached in column blue. In turn, the bit vector 512B for tint red is changed to exclude column 2 as a possible replacement column. The TLB entries for all tint red and tint blue pages are either flushed or modified in place to reflect the new bit vector. It is important to note, however, that only pages whose bit vectors will change need to have their TLBs updated/flushed. If, for example, virtual page 0 changed to tint blue, only its TLB entry needs to be updated/flushed.

The second tint mapping approach provides additional hardware support to avoid many of the flushing/changing of the TLB entries. Rather than storing the actual bit vector, column subset numbers can be stored within the TLB 612. An additional hardware structure, the tint-to-bit-vector unit, is introduced to store the mapping 520 (FIGS. 10B and 11B) between tints and bit vectors. Every time a replacement decision is made, the TLB is read, generating the tint that is then passed to the tint-to-bit-vector unit that stores the mapping information 520 and generates the bit vector. Such a solution requires additional hardware and introduces additional latency to the replacement unit, but eliminates the need to flush/modify the TLB when only a tint-to-bit-vector mapping change occurs. It should be apparent that such additional hardware can reside between the TLB and the replacement unit, taking the tint from the TLB and passing the final bit vector to the replacement unit.

With the exception of the updates to page table entries, TLB entries and the tint-to-bit-vector table, repartitioning can occur at anytime and incurs no penalties. Because of the associative nature of the cache, there is no need to move data within the cache on a repartition since data that is moved from one column to another is still part of the same set that the associative hardware will search. Instead, as data is brought into the cache, it is brought into the correct columns. Thus, repartitioning is performed lazily. A so-called victim cache can help avoid the transient thrashing that might occur during repartitioning as data replaces other data that might be still active.

Criteria other than simply the memory address can be used to generate mapping information. For instance, the memory operation, e.g., load or store, used to access the data can be put into different areas of the cache. The ability for memory operations to specify columns can be easily accommodated by adding additional tints that correspond to the supported memory operations to page table entries and the TLB. The memory operations can also be tagged with extra bits that specify a set of columns to replace. Such extra bits are already available in published instruction sets, such as the Intel IA- 64.

Another similar mapping criteria relates to "mode" bits set by special instructions or extra bits added to existing instructions that indicate where to map subsequent memory references. For example, a special instruction can be introduced to allow the instruction stream to specify that subsequent memory operations should be restricted to a single column. Such an ability is useful when different phases of the program exhibit different locality behavior. Another way to implement this functionality is to specify mappings based on the address of the memory instruction being executed. For example, a load from one instruction address may be cached in one set of columns while another load residing in a different instruction address to the same location may be cached in another set of columns.

The foregoing are example criteria; others can also be specified. Oftentimes, criteria are orthogonal and multiple ones can be supported simultaneously within a single system.

In addition to specifying which columns can be replaced by new data, a replacement policy can also be specified. For example, one memory region's accesses might be most compatible with a random replacement policy, while another most compatible with an least-recently-used (LRU) policy. The same methods for generating bit vectors can also generate a replacement policy that is passed to the replacement unit.

Column caching is compatible with any replacement policy but may require changes to certain implementations of those replacement policies to achieve maximum efficiency. For example, certain least-recently-used (LRU) implementations can hamper repartitioning in certain cases. Standard LRU algorithms consider all cache-lines in a set equal, a policy not well suited for column caching. If a column cache is repartitioned, a standard LRU algorithm may prevent the repartitioning from occurring because frequently accessed data is cached in columns to which it is not currently mapped.

For example, imagine that tint red is initially mapped to columns 0 and 1. Then, tint red is repartitioned to only column 0 while tint blue is mapped to columns 1 and 2. If tint red data cached in column 1 is accessed frequently enough relative to tint blue data, an LRU replacement algorithm will not allow tint blue data to displace the tint red data from column 1 and thus not allow tint blue data to use column 1. If column 0 contains tint red data that is not being accessed and no other data is mapped to column 0, that data will continue to reside in the cache, wasting that space.

These cases can be considered rare and thus ignored, eliminating the need to change the LRU implementation. Simple modifications to the LRU algorithm, such as updating LRU information only when data is found in a column to which it is mapped or updating LRU information of data found in a column to which it is not mapped to the least-recently-used state, eliminates this problem. Either solution reinforces repartitioning; data that does not belong in a specific partition is quickly replaced from that partition.

There are cases when mapping regions of memory to columns smaller than a page is desirable. One approach is to provide multiple tints per page entry to provide mapping resolution smaller than a single page. In the simplest case, there is one tint per mappable sub-page and the mappable sub-pages are of fixed size and aligned. More complex versions can have configurable mappable sub-pages.

Mapping to cache regions smaller than a column, however, can reduce functionality somewhat. For example, two memory regions may not be mappable to the same region of the cache and thus cannot be forced to conflict. One way to address this issue is to introduce a "cache address", an independent address generated with the physical address used to address memory. Standard caches use the physical address to determine the cache set, building an artificial dependence between the physical address and the cache location where the corresponding data is cached. By producing a cache address that can be used to determine the cache set, that dependence is broken, allowing data to reside anywhere in the cache regardless of its physical address. The standard physical address can still be used to generate the address tag. Even more flexibility is achieved by producing a cache address for each column. In such a configuration, each cache-line of the set can be at a different index into each column and each cache-line-aligned memory region can potentially map to a different set-class. Cache addresses, however, must also be supported by snooping hardware.

The cache address can be fairly simple and small. For example, assuming page-sized regions of memory that are mapped to columns larger than a page, an offset into each column for each memory page is sufficient to allow relocation of a page within a column. By restricting the offset to only be a multiple of the memory page size, the offset can be further reduced in size. Thus, each page table entry can store a page-granularity offset into each column. A scheme similar to tinting can be used to reduce remapping overheads. Of course, mapping criteria other than memory addresses, such as memory operation or memory instruction location, can be used to generate such offsets as well.

In this cache address scheme, the tints/bit vectors specifying which columns are candidates for replacement are still provided. Thus, not only can the position of specific data be specified within each column individually, but also the indications as to which columns are potential replacement points, regardless of which position in each column is specified, can be dynamically changed.

Figure 12:
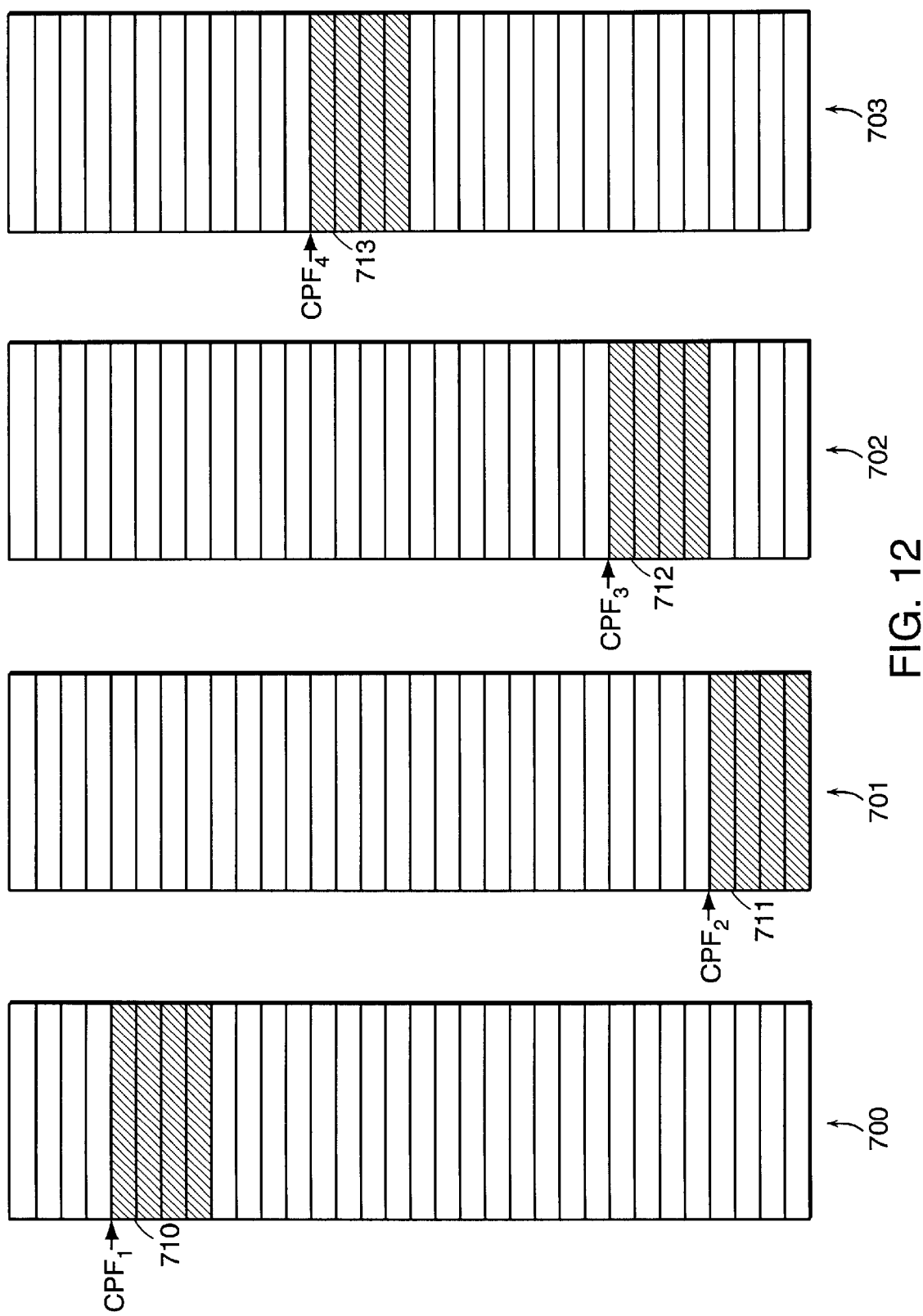
FIG. 12 illustrates a cache addressing mechanism.

An example of how a simple cache addressing scheme can work is shown in FIG. 12. In this example, a separate cache page frame (CPF) that specifies a base pointer into a page of four cache-lines 710, 711, 712, 713 is provided for each respective column 700, 701, 702, 703. These base pointers can be stored within the corresponding TLB and page table entries.

Figure 13:
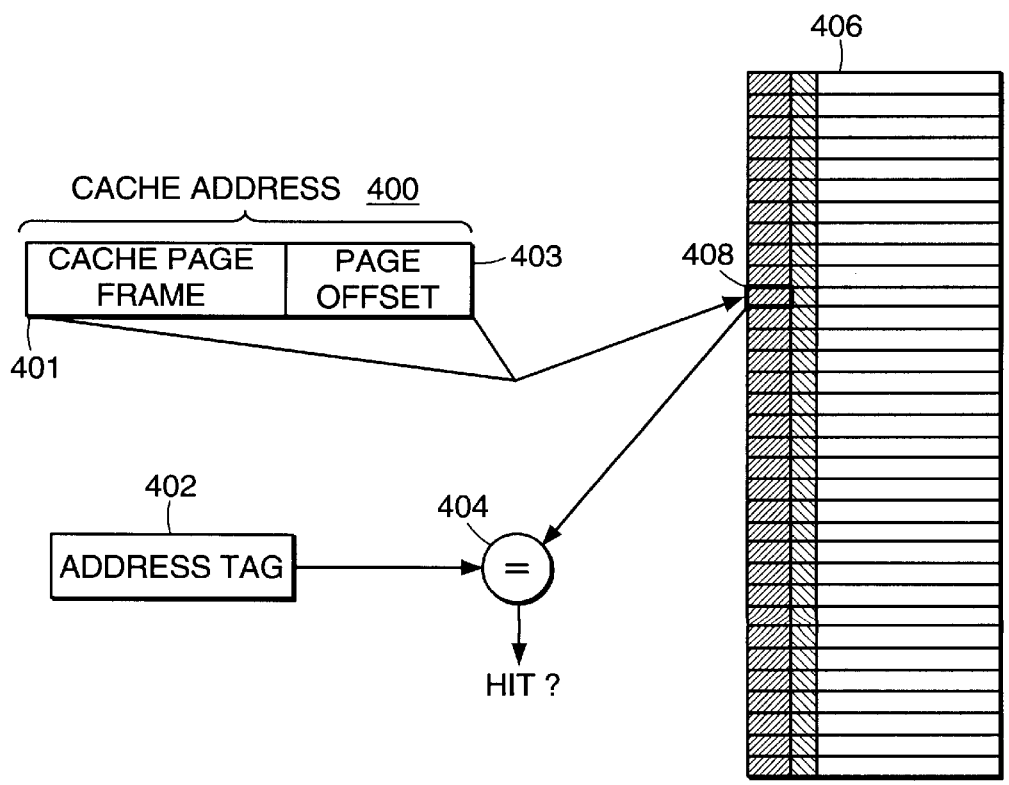
FIG. 13 is a block diagram illustrating mapping to a direct-mapped cache.

FIG. 13 illustrates how one-way data can be accessed from such a cache. The cache address 400, generated from the cache page frame 401 and the page offset 403, is used to determine the exact cache-line in each column 406. The address tag 402 generated from the physical page frame is compared to the address tag 408 stored in the cache-line to determine a hit.

Such a scheme that uses a separate cache address from the physical address potentially requires circuitry within the lookup critical path above a standard set-associative cache that can initiate lookup before translation occurs. Since the set mapping needs to be read in order to determine where to look in the cache for data, lookup cannot start until the set mapping has been determined. If the cache is accessed after translation completes, however, this scheme can incur no additional overheads over a standard cache access.

Using a separate cache address enables limited column caching abilities within direct-mapped caches. Data can be mapped to any arbitrary position within the cache (given the granularity of the cache address), thus enabling data to be located in a way to control conflicts within the cache. Remapping data to new cache addresses is expensive since data already in the cache may not be found during the associative lookup because the associative lookup is looking in a new place. Data needs to be either relocated in the cache or flushed from the cache when its set mappings change if cached data should be found in the cache.

More general embodiments of cache addressing are possible. For example, a functional unit that can execute a variety of different functions can be provided to generate the actual cache addresses from TLB output and the virtual or physical address. However, such additional processing can further impact lookup time and thus may be undesirable.

Providing separate cache addresses enables interesting mappings. For example, a region of memory 2*n*c pages large can be mapped across c columns in the following way: n cache pages in column 0, n/2 cache pages in column 1 and so on down to 1 page in column c -1. By manipulating the bit vectors, the size of the cache used to cache that region of memory can range from n pages down to 1 page in increments of one page, with only n-way associativity.

There are reasons, however, not to want to find cached data in the cache, such as using part of the cache as a speculative buffer. By preventing replacements and rerouting lookup, additional copies of the same data can exist within the same cache, providing a very quick roll-back to previous data.

A more general version of column caching may separate mapping information generation completely from the page table/TLB structures. If a specialized structure is used, much flexibility can be gained. For example, non-contiguous memory region patterns such as strided regions, or much finer mapping granularities can be supported.

It should be understood that column caching can be implemented at any or all levels in the cache/memory hierarchy. Each level can generate its own mapping information or the mapping information can be stored entirely in the TLBs and passed to each level of the memory hierarchy as needed.

Column caching can be configured from software via memory-mapped registers that allow protected access to update specific fields of a page table entry as well as the tint-to-bit-vector mapping. When executing column-caching-aware code on a machine that does not support column caching, the addresses corresponding to the memory-mapped registers should be mapped to a scratch page of memory.

It should be apparent that column caching applies to all caches, regardless of what such caches contain. Thus, these techniques apply to instruction caches, data caches, TLBs, etc. Specified columns can be virtual as well, rather than specifying physical columns. Such virtualization may simplify software and migration issues.

There are other ways to achieve cache mapping than ultimately binding data to a specific subset of columns, even if those columns are virtual. For example, mapping data to specific groups that are then restricting to reside within a certain number of cache-lines within each set enable control over caching resources without some of the inefficiencies of column caching. For example, oftentimes one or two sets may have so much data mapped to them that there are conflicts while other sets are not even full with data. By restricting groups of data to a certain number of cache-lines within each set while mapping groups to the same regions of the cache (that can still be specified by column mappings), data can better share the cache. Such a mechanism requires the ability to generate the limit number as part of the mapping information and further modifications to the replacement algorithm to enforce the restriction.

Assuming mapping controls are implemented via memory mapped registers or trappable instructions, only simple changes in the operating system need to be made to run cache mapped executables on processors that do not support cache mapping. Standard executables run unmodified on processors that support cache mapping.

The column caching mechanism is safe and will not deadlock. If a region of memory finds itself uncached and uncachable in any column, it essentially becomes uncached. Instructions that change page bit vectors should go through address translation or through the operating system to ensure that the software executing those instructions has the correct permissions to those pages.

Page coloring, i.e., mapping of physical pages to virtual pages, can achieve some of the same benefits of column caching, but can be hampered by cache organization, especially set associativity. Page coloring also requires costly copying of memory when remapping. Column caches can react much more quickly than a page coloring scheme.

Having described preferred embodiments of curious and column caching, application and advantages of the present invention are now described.

Column caching enables tuning the tradeoff between cache-resources and performance. In a traditional system, the entire cache is used by the currently running process. Thus, the running process is allowed to use all the resources to maximize its performance. If the running process does not need all of the cache or if the running process is not performance critical, however, there may be better uses for regions of the cache. Column caching allows the operating system to target a "global maximum", rather than throwing all available resources to the task at hand. With proper management, processor throughput can improve with either no degradation or even improvement in individual process latency.

Column caching can be used to control pollution. Memory references that have short temporal locality can "pollute" a standard cache, replacing data that should remain cached. Pollution is caused by multiple regions of locality sharing the same monolithic cache, e.g., a stream and a stack or a FIFO queue slightly larger than the capacity of the cache. Pollution can also be caused by sparse, random accesses such as accesses to a hash table or by regions of memory that have different access patterns depending on the phase of the program. To avoid damaging the locality of other regions, the multiple regions of locality should be dynamically separated into different partitions, as the situation dictates.

A standard cache has no provision for controlling pollution; in fact, the standard LRU replacement algorithm often aggravates pollution because it keeps recently accessed data (that is often not used again) and replaces less recently accessed data. Column caching can solve this problem by partitioning the different regions of locality into different partitions of the cache.

Column caching can be used to enable constructive interference. Purposely mapping a region of memory to a region of cache so that the current contents of the cache will be forced out is called "constructive interference". For example, a memory region can be mapped to a small cache region, allowing a region to constructively interfere with itself. Such self-interference is very useful for memory regions that are accessed in a stream-like fashion, such as a buffer. For example, a message passing transmit buffer of size n can be mapped to a cache region of size m, where n is much larger than m. If messages are written out nearly continuously, not only will this mapping limit pollution, it will automatically push out message data as new messages are being composed in the cache. In contrast, a standard cache would simply become polluted by the transmitted data and delay moving the transmitted data out to the network.

A standard cache has no provision for doing constructive interference. Some processors such as the PowerPC support cache management operations such as flush or clean, but the instruction stream must execute one such instruction per cache-line consuming instruction dispatch and load-store unit slots, the exact cache-line address must be tracked creating run-time overheads, and synchronization must be inserted to ensure that the cache management operations are executed after the last access to the cache-line, to avoid ping-ponging the cache-line.

Significant progress has been made in the area of cache-aware compiler optimizations. Through careful allocation of memory, careful layout of data structures on top of that memory and careful scheduling and insertion of loads/stores to ensure that the correct data remains in the cache, compilers (or the extraordinary user) can improve cache performance within a standard cache. Such optimizations fall loosely into one of two categories: data layouts/instruction reordering that improve hit ratios and instruction rearrangement or instruction addition (prefetching) to ensure that data is cached before it is used extensively. Most of these optimizations depend on knowing specific details about the cache such as total size, block size, associativity, replacement strategy, etc. The compiler combines that knowledge with its program analysis with the assumption of a dedicated cache. Such hacks, however, are imprecise because (i) the cache replacement algorithm may not be fully understood or may vary depending on the particular implementation, (ii) instruction reordering can occur within virtually all modem superscalar processors and (iii) process switches can swap in other code that subsequently destroys the careful layout. Different cache instances also have different sizes requiring fancier layout code.

Column caching facilitates compiler-based cache mapping techniques by guaranteeing mappings, ensuring that mapped memory stays mapped and that they do not interfere with other regions of memory. For example, standard blocking techniques can benefit from cache partitioning that can prevent other data from being displaced by the blocked data. In addition to optimizing compilers for sequential machines, column caches are natural targets for compilers that optimize parallel codes by mapping memory to different nodes in a distributed system.

Cache-line pinning is available in processors such as the Cyrix MII, while column-pinning is provided in other processors such as the Motorola 8240. The 8240 column-pinning allows software to specify that a specific column in the instruction cache not be replaced. Pinning eliminates a particular cache-line/column as a candidate for replacement, keeping the memory cached. Unfortunately, these mechanisms do not provide a way to determine whether the right data is in the cache when the pinning occurs, and potentially not pinning the data even though the instruction to do so was issued. In addition, at least for the cache-line mechanism, pinning requires an operation per cache-line to pin and probably another operation per cache-line to unpin.

Column caching has the ability to create dedicated SRAM within the cache by mapping a single memory page to a single cache page. However, this emulated SRAM is better than SRAM; it is automatically swapped in and out if the cache page is remapped rather than requiring an explicit swapping as is the case for a standard embedded SRAM. Of course, in order to guarantee performance, the load/store can be performed during remapping, just like with a dedicated SRAM. Such a structure is obviously of benefit to embedded applications as well as compilers that can detect and use embedded SRAMs.

The operating system can use column caches to improve multitasking. Current machines are fast enough to run a huge number of processes. Process switches, however, are limited by the cost of amortizing cache misses incurred by conflicts due to the multiple jobs, which are essentially cache pollution caused by multiple processes sharing the same cache. Such pressures can reduce the number of jobs a processor can realistically support.

Cache partitioning can improve the situation by locking down data from critical jobs to avoid that data being replaced before its job can be swapped back in. A standard cache will replace all of the data assuming that the total memory footprint of all jobs scheduled in between instances of the job in question is larger than the cache.

Cache trashing, another form of pollution, has also been observed in multithreaded systems, especially those that perform context switches on cache misses. Column caching can eliminate thrashing by ensuring that memory operations from one thread cannot interfere with the memory operations from another thread by simply mapping the memory used by the two threads to different regions of the cache. Column caching can also ensure that a critical job's state is not polluted by other, less critical jobs.

Harvard architectures that imply separate instruction-data caches are a classic example of a statically-partitioned cache. Column caching can eliminate cache conflicts between instructions and data sharing the same cache while better utilizing the combined cache. Often times, programs with small instruction footprints have large data footprints (scientific codes) and programs with large instruction footprints have small data footprints. Certain commercial processors, such as the Cyrix 6×86MX have fast, unified caches.

By partitioning the cache and specifying special replacement policies, part of a mapped cache can be used for speculative thread execution. In speculative execution, either (i) a branch is predicted and a path is speculated, (ii) a non-blocking request for a lock is issued and the thread is started on the assumption that the lock will eventually be returned or (iii) execution continues based on a speculated data value. Until the speculation is resolved, no writebacks can occur. Once that happens, writebacks are reenabled. If the speculation fails, the mapped regions of the cache are invalidated without being written back. Deadlock is possible in the locking case, but can be circumvented by timeouts. By partitioning the cache in a column cache, the speculation writes can be contained in a small part of the cache, potentially eliminating the need for special speculation store buffers, and speculation-initiated cached memory operations can be isolated to prevent pollution.

The preceding described several applications and advantages of column caching. The following describes several applications and advantages associated with curious caching.

It should be understood that curiosity is especially useful to improve the performance of memory regions used for communication. Curious caching, combined with column caching, can implement message passing receive buffers within the cache. As data is received, the network interface simply writes the data to memory. The cache, if made curious about the data, can bring a copy of the new messages into the cache for very quick access. Advanced forms of curiosity that allow curiosity to be conditional on the current cache state can even limit curiosity to incorporating only data that is at the head of the message queue.

Curiosity can also enable or enhance performance hacks. For example, a separate prefetch engine can be incorporated into the memory controller that then determines reference patterns and puts that data on the bus for the curiosity to incorporate into the cache. The memory controller is generally the bus arbitrator and thus knows when the bus is idle, allowing the prefetch to use only bus cycles that would be otherwise wasted. Another bus device can also provide external prefetching. For example, another processor can implement this functionality, executing codes that can more accurately model what will be needed in the future and prefetch those locations for the working processor. These prefetching techniques provide better performance than stream buffers since the data is brought directly into the cache while eliminating the need for the stream buffers.

Curiosity can also be used to force data out of a cache by being curious about bus transactions that will replace unwanted data or data that needs to be written-back as soon as possible. Rather than issuing separate flush operations to force out newly produced data, a producer can be curious about what the consumer was reading or pushing out. Since the consumer is reading data different from the data that the producer is currently producing, the producer will replace old produced data with newly consumed data. If the producer has sufficient cache space mapped to the communication buffer, that data brought into the producer in exclusive state avoids the need for the producer to get permission to write that data. Instead of moving data, curious caching enables the prefetching of the write-permission alone, allowing a device to push write-permission to another device. To do so, the producer should be curious about a flush operation (that must be propagated to the bus), incorporating a exclusive state into its cache without getting the useless data.

A column/curious cache can take advantage of many memory performance optimizations designed for distributed/parallel systems, such as memory-mapping, but can often do better than the hardware for which the optimizations were designed. For example, global memory management allows nodes in a distributed system to page to memory on other nodes, thus using remote memory as a disk substitute. Curiosity can do the same for caches, but more efficiently since no software involvement is necessary.

Curious caching can further enhance emulated memory. The SRAM/memory emulation capability of curious caching, however, is more powerful than a true explicit SRAM because (i) with appropriate modifications, it can serve as SRAM to other bus devices, (ii) it allows lazy swapping of the emulated SRAM and (iii) exists in the same address space as the standard RAM. If the performance demands on that memory are reduced, the cache region can be remapped and curiosity removed without having to copy the data to standard memory as would be required with an explicit SRAM. If performance is not terribly critical, swapping in can also be done lazily rather than eagerly. Of course, if performance does matter, swapping can be done explicitly as well. Column caching on its own can emulate memory, but only for a single processor using its own cache as the emulated memory unless there are special changes made to the coherency protocol.

The same instruction set architecture is often shared between embedded processors and general-purpose processors, such as in the PowerPC family. A curious cache brings embedded and general-purpose processors closer together, allowing more shared development and enabling general-purpose processors to better emulate embedded processors. Such closeness can reduce time to market and give an accurate development environment for embedded processors that often appear after the general-purpose version. Putting a curious cache in an embedded processor or DSP allows better utilization of that valuable state, allowing the region to be dynamically partitioned between cache and explicit SRAM.

Processors-in-memory systems (PIMs) implemented with curious caches instead of memory provide the benefits of PIMs with all of the performance and functionality benefits of curious caching. Though more costly to implement because of the cache structures, a column/curious cache has significant advantages over a PIM. Memory can be easily migrated from one processor to another in a column/curious cache since all the memory is implemented in cache. Communication can potentially become much faster. Multiple copies are much easier to support. Data movement is automatically managed by hardware but under software-defined policies.

Making a cache curious about synchronization variables can dramatically speed up synchronization within that cache.

There are many management possibilities for mapped caches. Each process can be given the entire cache to manage when it is running, the operating system (OS) can manage the entire mapped cache, or the operating system can manage the cache with hints from the running processes. The last option, which is very similar to user-level page management, is probably the best in the long term.

The OS can use mapped caches to manage the cache in the face of multitasking. Current machines are fast enough to run a large number of processes. However, process switches are limited by the cost of amortizing cache misses incurred by conflicts due to the multiple jobs. This cost includes cache pollution caused by multiply processes sharing the same cache. Such pressures can reduce the number of jobs a processor can realistically support.

Researchers have demonstrated that for several applications only a few memory instructions cause most of the cache misses. Simple hardware (or compilers) can track these "missing" memory instructions to determine whether to cache loaded data on an instruction-by-instruction basis, yielding fairly good results. It addresses the worse pollution, but cannot deal with data that should be cached, but should take less space that a standard replacement algorithm allocates it.

Most current and future processors provide support to allow uncached writes to be store-gathered, that is, consecutive writes to an uncached page will be gathered into a more-efficient burst transfer on the bus. This support allows regions of memory that would normally pollute the cache be mapped uncached but still use the fast burst path to the bus. Regions of memory mapped uncached for transmit must either be mapped cached for receive, requiring an additional virtual mapping to the same physical pages, or must have corresponding modifications to the receiving path to achieve reasonable receive bandwidth. In addition, not all stream data sequentially addresses the cache and there may be reason to cache the written data as well.

These sorts of cache management instructions and policies can be used with column caching to provide additional flexibility. Column caching, however, can provide many of the same benefits and is, in many ways, easier to conceptualize and use since it deals with regions of memory rather than individual instructions.

While this invention has been particularly shown and described with references to preferred embodiments thereof, it will be understood by those skilled in the art that various changes in form and details may be made therein without departing from the scope of the invention encompassed by the appended claims.

What is claimed is:

1. In a system having at least one cache coupled to a memory through a communications medium, a method for inserting information into a particular one of the at least one cache comprising:

specifying at least one curiosity region to be monitored independent of cache content and prior access to the at least one curiosity region;

monitoring operations with the memory on the communications medium to identify at least one curiosity region; and writing information associated with the at least one curiosity region from the communications medium into the particular one of the at least one cache.

2. The method of claim 1 wherein writing information includes writing data.

3. The method of claim 1 wherein writing information includes writing memory instructions.

4. The method of claim 1 wherein specifying at least one curiosity region to be monitored includes another device specifying at least one curiosity region to be monitored.

5. The method of claim 1 wherein the communications medium comprises a bus.

6. The method of claim 1 wherein the communications medium comprises a data network.

7. The method of claim 1 further comprising specifying the operations to be monitored.

8. In a system having a plurality of bus devices, each bus device connected to a shared bus through an associated cache, a method for inserting data into the associated cache comprising:
   specifying curiosity data addresses to be monitored independent of cache content and prior access to said curiosity data addresses;
   monitoring bus operations between other bus devices and a shared memory on the shared bus to identify curiosity data addresses; and
   writing curiosity data from the shared bus into the associated cache.

9. The method of claim 8 further comprising specifying the bus operations to be monitored.

10. The method of claim 9 wherein specifying curiosity data addresses includes specifying one or more permission states of the curiosity data.

11. The method of claim 10 further comprising providing curiosity information associated with cache-lines in the associated cache.

12. The method of claim 8 wherein specifying curiosity data addresses includes specifying a range of snooped bus addresses.

13. The method of claim 8 wherein each bus operation includes a physical address and associated data and wherein specifying includes providing a translation structure having plural entries, each entry comprising a physical address and curiosity information, and monitoring includes accessing the translation structure with the physical address of each bus operation and upon locating a matching entry, determining from the curiosity information in the matching entry whether to write the associated data into the cache.

14. The method of claim 8 further comprising specifying a region of the associated cache in which to write the curiosity data and wherein writing includes writing the curiosity data into the specified cache region.

15. The method of claim 8 further comprising specifying a replacement policy for the curiosity data addresses and wherein writing includes writing the curiosity data into a specified cache region using the replacement policy.

16. The method of claim 15 wherein the replacement policy specifies the cache region for replacement.

17. In a system having plural caches coupled to a shared memory through a communications medium, a curious cache comprising:
   a structure specifying curiosity regions to be monitored independent of cache content and prior access thereto;
   a monitor for monitoring operations with the shared memory on the communications medium to identify curiosity regions; and
   a cache replacement unit for writing information associated with the curiosity regions from the communications medium into the curious cache.

18. The curious cache of claim 17 wherein the communications medium comprises a bus and wherein the structure further specifies the bus operations to be monitored.

19. The curious cache of claim 18 wherein each bus operation includes a physical address and associated data and wherein the structure includes plural entries, each entry comprising a physical address and curiosity information.

20. In a system having a plurality of bus devices, each bus device connected to a shared memory and a shared bus through an associated data cache, a curious cache comprising:
   cache means for storing cache content;
   means for specifying curiosity data addresses to be monitored independent of cache content and prior access to said curiosity data addresses;
   means for monitoring bus operations between other bus devices and the shared memory on the shared bus to identify curiosity data addresses; and
   means for writing curiosity data from the shared bus into the cache means.

21. The curious cache of claim 20 wherein each bus operation includes a physical address and associated data and wherein the means for specifying includes a translation structure having plural entries, each entry comprising a physical address and curiosity information, and the means for monitoring includes means for accessing the translation structure with the physical address of each bus operation and upon locating a matching entry, determining from the curiosity information in the entry whether to write the associated data into the cache means.

22. The curious cache of claim 20 further comprising means for specifying a region of the cache means in which to write the curiosity data and wherein the means for writing includes means for writing the curiosity data into the specified cache region.

23. The curious cache of claim 22 wherein the cache comprises an N-way set associative cache divided into N columns and wherein the means for specifying a region of the cache includes a bit vector having N bits, each bit identifying one of the N columns for replacement.

24. In a system having a plurality of bus devices, each bus device connected to a shared memory and a shared bus through an associated data cache, a curious cache comprising:
   a cache portion for storing cache content;
   a buffer specifying curiosity data addresses to be monitored independent of cache content and prior access to said curiosity data addresses; and
   a bus interface unit coupled to the bus for monitoring bus operations between other bus devices and the shared memory on the shared bus to identify curiosity data addresses and for writing curiosity data from the shared bus into the associated cache.

25. The curious cache of claim 24 wherein each bus operation includes a physical address and associated data and wherein the buffer includes a translation structure having plural entries, each entry comprising a physical address and curiosity information, and the bus interface unit includes accessing the translation structure with the physical address of each bus operation and upon locating a matching entry, determining from the curiosity information in the entry whether to write the associated data into the cache.

26. In a system having a cache and a memory, a method of managing the cache comprising:
   providing a memory having at least two memory regions;
   dividing the cache into at least two cache regions;
   mapping at least one of the at least two memory regions to at least one of the cache regions on the basis of at least one memory criterion; and
   placing memory region data into the corresponding mapped cache region.

27. The method of claim 26 further comprising specifying a replacement policy for each memory region and wherein placing includes placing memory region data into the corresponding mapped cache region using the specified replacement policy.

28. The method of claim 27 further comprising using the specified replacement policy to select a replacement cache-line in the mapped cache region.

29. The method of claim 26 wherein the cache comprises an N-way set associative cache, where N is a positive integer, dividing the cache comprises dividing the cache into N columns and mapping each memory region comprises associating a memory tint with each memory region, mapping the memory tint to a bit vector, the bit vector having N bits, each bit identifying one of the N columns.

30. The method of claim 29 wherein an asserted bit of the bit vector indicates that the memory region data can be replaced in the corresponding column.

31. The method of claim 26 wherein the cache comprises an N-way set associative cache divided into N columns and further comprising translating a virtual address to generate a cache address for accessing the cache.

32. The method of claim 31 further comprising accessing the cache using a cache address having a cache page frame and a page offset to determine a cache-line in a particular column and comparing an address tag stored in the cache-line with an address tag generated from the cache address to determine a cache hit.

33. The method of claim 26 wherein the cache comprises an N-way set associative cache, where N is a positive integer, dividing the cache comprises dividing the cache into N columns and mapping each memory region comprises associating a bit vector with each memory region, the bit vector having N bits, each bit identifying one of the N columns.

34. The method of claim 33 wherein an asserted bit of the bit vector indicates that the memory region data can be replaced in the corresponding column.

35. The method of claim 26 wherein the at least one memory criterion is memory address.

36. The method of claim 26 wherein the at least one memory criterion is memory operation.

37. The method of claim 26 wherein the at least one memory criterion is memory operation instruction address.

38. The method of claim 26 wherein the at least one memory criterion is a mode bit indicating a replacement mode.

39. A memory system comprising:

a memory having at least two memory regions;

a cache divided into at least two cache regions;

means for mapping at least one of the at least two memory regions to at least one of the cache regions on the basis of at least one memory criterion; and means for placing memory region data into the corresponding mapped cache region.

40. The system of claim 39 further comprising means for specifying a replacement policy for each memory region and wherein the means for placing includes means for placing memory region data into the corresponding mapped cache region using the specified replacement policy.

41. The system of claim 40 wherein the cache comprises an N-way set associative cache divided into N columns and the means for mapping associates a memory tint with each memory region, the memory tint mapped to a bit vector having N bits, each bit identifying one of the N columns.

42. The system of claim 41 wherein an asserted bit of the bit vector indicates that the memory region data can be replaced in the corresponding column.

43. The system of claim 41 further comprising means for accessing the cache using a cache address having a cache page frame and a page offset to determine a cache-line in a particular column and means for comparing an address tag stored in the cache-line with an address tag generated from the cache address to determine a cache hit.

44. The system of claim 39 wherein the at least one memory criterion is memory address.

45. The system of claim 39 wherein the at least one memory criterion is memory operation.

46. The system of claim 39 wherein the at least one memory criterion is memory operation instruction address.

* * * * *